US007480619B1

(12) United States Patent
Scott

(10) Patent No.: US 7,480,619 B1
(45) Date of Patent: Jan. 20, 2009

(54) INTEGRATION MANAGER AND NATURAL INTERACTION PROCESSOR

(75) Inventor: Neil G. Scott, Honolulu, HI (US)

(73) Assignee: The Board of Trustees of the Leland Stanford Junior University, Palo Alto, CA (US)

(*) Notice: Subject to any disclaimer, the term of this patent is extended or adjusted under 35 U.S.C. 154(b) by 897 days.

(21) Appl. No.: 10/793,183

(22) Filed: Mar. 4, 2004

Related U.S. Application Data

(60) Provisional application No. 60/452,262, filed on Mar. 4, 2003.

(51) Int. Cl.
*G10L 11/00* (2006.01)
*G06F 17/27* (2006.01)

(52) U.S. Cl. .................................. 704/275; 704/9
(58) Field of Classification Search .................. None
See application file for complete search history.

(56) References Cited

U.S. PATENT DOCUMENTS

| | | | |
|---|---|---|---|
| 5,062,060 A | 10/1991 | Kolnick | 364/521 |
| 5,335,323 A | 8/1994 | Kolnick | 395/164 |
| 5,555,169 A * | 9/1996 | Namba et al. | 704/9 |
| 5,729,659 A * | 3/1998 | Potter | 704/270 |
| 5,956,711 A * | 9/1999 | Sullivan et al. | 707/6 |
| 6,083,270 A | 7/2000 | Scott | 703/24 |
| 6,144,989 A | 11/2000 | Hodjat et al. | 709/202 |
| 6,434,524 B1 | 8/2002 | Weber | 704/257 |
| 6,499,013 B1 | 12/2002 | Weber | 704/257 |
| 6,532,444 B1 | 3/2003 | Weber | 704/257 |
| 6,584,439 B1 * | 6/2003 | Geilhufe et al. | 704/270 |
| 6,594,684 B1 | 7/2003 | Hodjat et al. | 709/202 |
| 6,654,720 B1 * | 11/2003 | Graham et al. | 704/270 |
| 6,990,639 B2 * | 1/2006 | Wilson | 715/863 |
| 7,092,928 B1 * | 8/2006 | Elad et al. | 706/60 |
| 7,302,383 B2 * | 11/2007 | Valles | 704/9 |

* cited by examiner

*Primary Examiner*—David R Hudspeth
*Assistant Examiner*—Brian L Albertalli
(74) *Attorney, Agent, or Firm*—Womble Carlyle Sandridge & Rice, PLLC

(57) ABSTRACT

Natural interaction command decoder implemented on small embedded microprocessors. Strings of text from multiple input sources are merged to create commands. Words that are meaningful within the current system context are linked to all dependent output events while words that have no meaning within the current system context are automatically discarded.

14 Claims, 19 Drawing Sheets

Event Template
(One for each Event in the command Decoding Matrix)

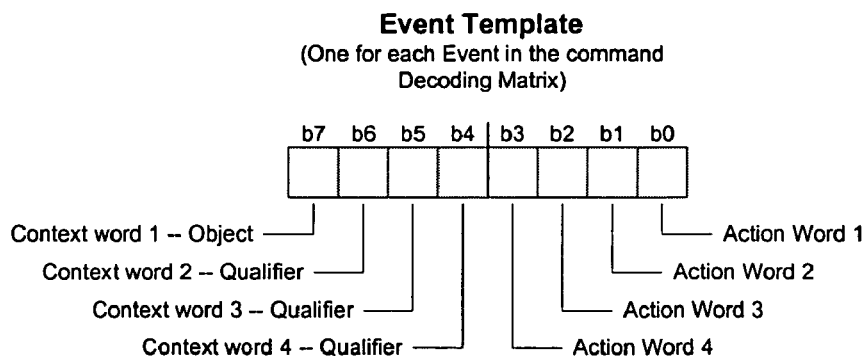

Context word 1 -- Object — b7
Context word 2 -- Qualifier — b6
Context word 3 -- Qualifier — b5
Context word 4 -- Qualifier — b4
Action Word 1 — b0
Action Word 2 — b1
Action Word 3 — b2
Action Word 4 — b3

Notes:
Context Words are added in order b7, b6, b5, b4.

b7 must be an object, e.g., tv.

b6, b5, and b4 qualify the object, e.g., "Sony" or "Kitchen," as in: "Turn on the Sony TV in the kitchen."

This would be entered as:
    b7 represents TV
    b6 represents Sony
    b5 represents kitchen

FIG. 13

CONTEXT FLAG

| 0 | 0 | 0 | 0 | 0 | 0 | 0 | 0 |

The Context Flag is set to zero at the start of each decoding cycle

All recognized words are Logically ORed with the Context Flag. The address byte is pushed onto a stack If bit 7 of the Context Flag is set during this operation.

Since a valid command must have an object specified by bit 7 being set to 1, the Context Flag will also have this bit set if one or more candidates exist for commands when an End of Message (EOM) is receivied or the system times out.

If bit 7 of the Context Flag is true, each of the stored addresses is pulled off the stack and the template byte is recovered. Only templates with the Action Nibble = &HF are kept. Of the templates that are kept, the one with the highest value (unsigned byte) is the winner since we know it has an object and it must have the most valid qualifiers.

FIG. 14

"Turn on the lamp"
set b0 to 1 — set b7 to 1
Initial template for "lamp on"
Final Template value =&H8F (a) One action word, one context word "Turn off the lamp"
set b0 to 1 — set b7 to 1
Initial template for "lamp off"
Final Template value =&H8F (b) Different action word, same context word "Turn on the bed lamp"
set b0 to 1 — Set bit 7 to 1
Set bit 6 to 1
Initial template for "bed lamp on"
Final Template value =&HCF (c) One action word, two context words "Turn on Neil's bed lamp"
set b0 to 0 — Link to b7
Link to b6
Link to b5
Initial template for "Neil's bedlamp on"
Final Template value =&HEF (d) One action word, three context words "Turn Neil's bed lamp on at half brightness"
Link to b7 — set b2 to 0
set b1 to 0
set b0 to 0
Initial template for "Neil's bed lamp on half brightness"
Final Tempalate value =&HEF (e) Three action words, three context words

INTEGRATION MANAGER AND NATURAL INTERACTION PROCESSOR

CROSS-REFERENCE TO RELATED APPLICATIONS

The present patent application is a formalization of a previously filed, co-pending provisional patent application entitled, "Integration Manager and Natural Interaction Processor," filed Mar. 4, 2003, as U.S. provisional patent application Ser. No. 60/452,262 by the inventor named in this patent application. This patent application claims the benefit of the filing date of the cited provisional patent application according to the statues and rules governing provisional patent applications, particularly, 35 USC § 119(e)(1) and 37 CFR §§ 1.78(a)(4) and (a)(5). The specification and drawings of the provisional patent application are specifically incorporated herein by reference. This patent application is also related to co-pending and commonly assigned patent application entitled, "Intelligent Total Access System," Ser. No. 10/642,022, filed Aug. 15, 2003. This patent application claims the benefit of the filing date of provisional patent application 60/404,034, filed Aug. 16, 2002. The co-pending patent application is hereby incorporated by reference into this description as fully as if here represented in full.

STATEMENT REGARDING FEDERALLY SPONSORED RESEARCH

This invention was made with Government support under contract 0071126 awarded by the National Science Foundation. The U.S. Government has certain rights in the invention.

BACKGROUND OF THE INVENTION

The invention relates generally to Information Technology (IT) devices, and in particular to an Integration Manager and Natural Interaction Processor (IMNIP) that addresses the need for embedded Information Technology (IT) devices to recognize user commands that are expressed using natural language and gesture. The natural language commands may be input directly by the user or generated by intelligent switches or sensors.

The inventor of the present invention has spent the last twenty-five years developing user interfaces that make it easier for disabled and aging people to use information technologies (IT) such as computers, telephones, and electronic control devices. While many of the devices encountered by these people perform similar tasks, they present the user with different interfaces and interaction strategies that make it necessary for the user to learn how to work with each one. This can be overwhelming for many people, particularly if they have memory or cognitive limitations. One of the strategies for overcoming this type of problem is to create interfaces that respond to naturally spoken commands and gestures. Natural Language Processing (NLP) is an essential component for such interfaces. While there is a large body of work in the NLP field, existing implementations require large fast computers to achieve acceptable real-time performance. Initial intelligent user interfaces used a software agent based NLP system to translate free speech commands into specific commands for interacting with computers and IT. Practical problems were encountered with this solution due to the need for a fast processor with large amounts of RAM, slow processing speed, and high licensing costs. An analysis of these problems and the required performance led to the present invention of a new embeddable system that meets the required performance specification while eliminating problems with size, speed and cost. It also incorporates an Integration Manager (IM) to merge multiple streams of input data. Whereas the IM function required a separate software module in the original NLP system, the new inventive system automatically performs the integration of multiple inputs. Because it is able to integrate and process inputs derived from multiple input devices such as keyboards, speech recognizers and a variety of pointing devices, the new system is described as an Integration Manager and Natural Interaction Processor (IMP). In a conventional NLP system, each user command is received as a single complete string of text that is broadcast to a network of software agents. Each agent is programmed to recognize a keyword and synonyms for that word. An individual agent asserts a claim if it recognizes a word in the command string. After a short delay, all of the asserted claims are collected and analyzed to determine if the pattern of asserted claims matches any predefined patterns of agents that represent particular outputs. This is an inherently slow process due to the amount of sequential processing required to execute all of the individual agent programs and the large amount of string comparisons and message passing that is necessary. Additionally, the agent-based software requires a large amount of message buffering in RAM. This is a serious problem for embedded systems that use small low-cost microprocessors that have minimal amounts of RAM.

The newly invented IMNIP uses an entirely different strategy to achieve the required speed and compact code. It is no longer necessary to wait until a complete command is received before beginning to process it. The IMNIP decodes each character as it is received and produces an output as soon as an unambiguous result is detected. Instead of storing and processing large numbers of text strings in RAM, as was necessary in the agent-based system, the IMNIP uses pointers, tables and arrays that can be pre-compiled and stored in ROM.

SUMMARY OF THE INVENTION

The IMNIP is an embedded computer application that interprets user intent by matching input from an access device or group of access devices to known behaviors of electronic devices that are connected either directly to an individual IMNIP or connected to an IMNIP network. The IMNIP integrates input from the user by identifying predefined words and matching them to output device control commands. Each connected device, IMNIP and accessor in an IMNIP network has a unique ID, which allows bypass of the interpreter on, and individual IMNIP and pass through command packets to recognized locations. This allows users to work in groups and to quickly control devices that are not directly connected to their individual IMNIP. It also allows other parts of the network to retain information about directly connected devices. If a user attempts to control a device that is not directly connected the closest IMNIP, the network is searched for that device.

Accessor devices may be standard input devices such as keyboards and mice, or they may be specialized devices such as speech recognition systems, alternative switch devices, or graphic based tablets. Accessors and devices to be controlled identify themselves to the IMNIP system and provide a corpus of available Action words as well as information for assisting users and parameters for specialized control. Predefined macros can also be created to allow users to control several devices or a series of functions on devices with single commands. Individual devices may be disconnected from and IMNIP and moved to other locations in the network. The unique identity of the device will remain constant through its ID, however the corpus of information and information about that device will be removed from the previously connected IMNIP and resent and initialized to the directly connected IMNIP.

Words sent by the user to the IMNIP are matched through the use of a multi-plane Parsing Tree. As words and synonyms are recognized in a Word Pointer Table, an Event Word-Mask identifies the location of the word in the Event Decoding Matrix which watches for a complete command match. As the command match develops, an Event Template is created. Once all of the words included in a know command for a connected device are received, a command definition string or set of commands defined in a macro are sent to a Command Generator. The devices to be control define expected behaviors due to exception cases and incomplete commands and users may be prompted as to how to complete the command or correct an error.

Information specific to the state of the system, the state of devices in the system, permissions for communication between users and devices, timing parameters, generated command and address are passed to the Output Packet Manager and routed to the correct destination.

The system state monitor provides information about the state of devices that are controlled by the IMNIP to prevent the command generator from issuing any toggling commands that would inadvertently change the state of a device.

BRIEF DESCRIPTION OF DRAWINGS

The invention is better understood by reading the following detailed description of the invention in conjunction with the accompanying drawings, wherein:

FIG. 13 illustrates the structure of the event template in accordance with an exemplary embodiment of the present invention.

FIG. 14 illustrates the context flag in accordance with an exemplary embodiment of the present invention.

FIG. 18 illustrates examples of event templates for different combinations of action and context words in accordance with an exemplary embodiment of the present invention.

DETAILED DESCRIPTION OF THE INVENTION

Figure 1:
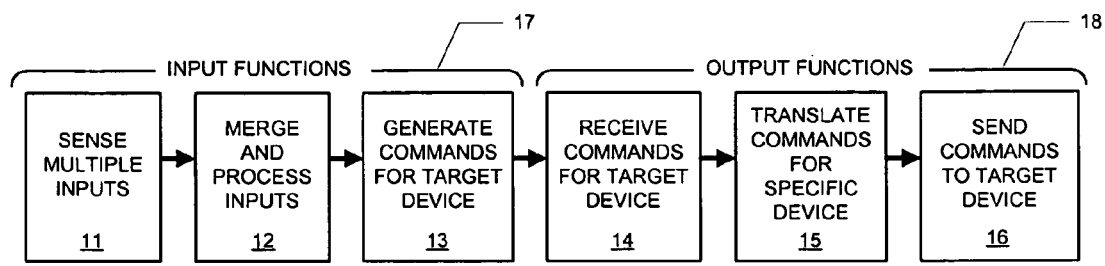
FIG. 1 illustrates the functional components of an IMNIP used for connecting input and output functions in accordance with an exemplary embodiment of the present invention.
Figure 2:
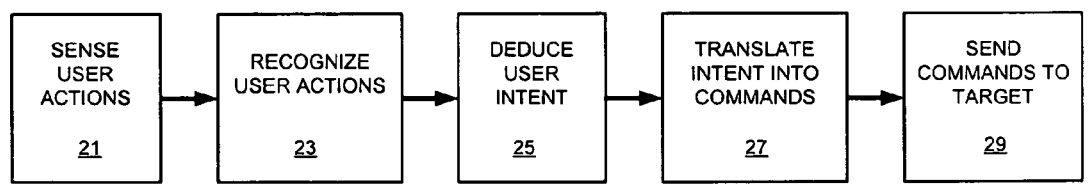
FIG. 2 illustrates the operational components of a generic IMNIP that generates commands based on user intent in accordance with an exemplary embodiment of the present invention.

The following description of the invention is provided as an enabling teaching of the invention and its best, currently known embodiment. Those skilled in the art will recognize that many changes can be made to the embodiments described while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations of the invention are possible and may even be desirable in certain circumstances and are part of the present invention. Thus, the following description is provided as illustrative of the principles of the invention and not in limitation thereof since the scope of the present invention is defined by the claims.

The following definitions of terms used in this description are provided for ease of reference by the reader:

Accessor is a personal access device that provides interface capabilities matched to individual needs, abilities and preferences.

Accessible interface is an interface that can be used by a person with diminished capabilities.

Cable connections are hardwired connections between accessors and ITAPs.

Context word is a word that defines a device that is to receive currently generated commands.

EOM is an end of message character that defines the end of a message that is sent to an IMNIP.

Embeddable IMNIP is a natural language and natural gesture recognition system that can be implemented on a small microprocessor.

IMNIP—Integration Manager and Natural Interaction Processor.

Intention Driven Systems is a system that uses an IMNIP to determine the intentions of a user from one or more natural language or natural gesture inputs.

IT—Information Technology.

IT Appliance is a computer device that provides access to information.

Intelligent Total Access Port (ITAP) is a Total Access Port that includes an IMNIP for interpreting natural language and gestures.

Intelligent Total Access System (ITAS) is a complete TAS that includes IMNIPs in the accessors and ITAPs to enable the system to respond to natural language and natural gestures.

ITAS Corpus is a collection of words that define most of the common commands that can be performed by the ITAS.

Macro is a phrase that represents a group of commands.

Natural gestures are uncontrived gestures that are detected by motion sensors such as gyroscopes, accelerometers, or video cameras with pattern recognition.

Natural Language is communications between people and machines and between machines based on natural human language.

Natural Interaction Processor (NIP) includes software and/or hardware system that interprets natural text and natural gestures to generate commands for a target system.

Parsing Tree is a tree-based structure for identifying words that are received by an IMNIP.

Total Access Port (TAP) is a device that emulates the standard user interface devices on a target system and provides cable or wireless connections to one or more accessors (precursor to the ITAP).

Total Access System (TAS) is a complete accessibility solution consisting one or more accessors interacting with a TAP (precursor to the ITAS).

Target System is a computer-based device that is to be operated by a person through a user interface.

Wireless connection is spread spectrum radio frequency communications between accessors and ITAPs.

The present invention provides a technique for implementing an Integration Manager and Natural Interaction Processor on conventional desktop and notebook computers or embedded in small microprocessor-based control devices. While specifically designed for the Intelligent Total Access System (ITAS), which is fully described in co-pending, commonly owned U.S. patent application Ser. No. 10/642,022, and is fully incorporated by reference herein, the IMNIP can be used in any situation requiring a person to command and control a computer-based device. The IMNIP operates independently of the input modality and is able to integrate inputs from multiple sources such as keyboards, speech recognizers, touch panels, Morse code and gestures. The strategies developed for the IMNIP provide significant advantages over earlier agent based NIP designs as follows:

1. the prototype IMNIP merges and decodes up to four input message streams, but can be generalized to support any number of message streams;
2. individual characters are parsed as they are received thereby eliminating the need to buffer strings of input data;
3. all operations in the IMNIP are driven by pointers into tables and arrays, thus eliminating string manipulations and providing instantaneous translation from an input command to an output event;
4. the IMNIP can be implemented equally well on large computers and small embedded microprocessors;
5. the IMNIP design is scaleable and can support any size corpus of command words;
6. the IMNIP can simultaneously parse multiple word lists;
7. the IMNIP decodes single word commands, random order multiword commands, fixed order multiword commands, macro commands and embedded multiword device names;
8. the IMNIP filters out unwanted words that precede or follow a macro or are embedded within a macro;
9. the IMNIP can separate and act upon macros and parameters contained within a single message;
10. almost all mode switching between macros and isolated words is eliminated;
11. the IMNIP enables simple devices to communicate efficiently using text messages;
12. the IMNIP makes "Intention Driven Technology" feasible and practical; and
13. the system can support multiple human languages.

The Integration Manager (IM) determines user intent from an analysis of user-generated text messages and gestures and translates that intent into commands that are recognized by the intended IT target device. This involves the following steps: (i) multiple threads of user-generated input are integrated into a single stream of text, (ii) words that have no meaning within the present context are filtered out by a parser, (iii) whenever a word is recognized by the parser, the system tags all occurrences of that word that are used to define events, (iv) when the input message is completed, check to see if there is an output command that has a tag on every required word, and if so, (v) perform the selected command. All of these steps are performed in real-time using pointers into tables of bytes that represent word masks, event templates and output commands; and arrays of strings that represent all occurrences of words within the recognized commands.

An Event Decoding Matrix provides the bridge between the words entered by the person and the words required to trigger a particular event. An event may consist of a single command, such as "TV on" or it may consist of a macro that initiates many commands, such as "watch movie" that might expand into a stream of commands to close the drapes, adjust the lighting, turn on the TV, turn on the DVD, and press the play button on the DVD. Each event in Event Decoding Matrix is represented by a single-byte Event Template. A single bit in the Event Template represents each word required to trigger the particular event.

One major advantage of the technique developed for the IMNIP is that each word appears only once in the complete system, specifically, as a single branch in the Parsing Tree. There are no string manipulations or string comparisons in the recognition process.

User-generated input messages derived from typing, speech recognition, gestures, and so on, are applied to separate input channels on a Parsing Tree that contains all of the keywords and synonyms that that can be recognized by the IMNIP. Parsing is performed word by word. Each input channel has its own node pointers and can receive input text asynchronously. A pointer to a single entry in the Word Pointer Table is attached to the last character of each word in the Parsing Tree. Each entry in the Word Pointer Table is also a pointer into an array of strings. Each of these strings defines all occurrences of a particular word or synonym in the commands and macros that are recognized by the IMNIP.

Words handled by the IMNIP are designated as either context words or action words. Context words either specify a particular object (e.g., TV) or they qualify the object (e.g., Sony). The designation takes place in the Event Mask String Array. The same word can be used as an object in one Event Mask and as a qualifier in another. Context words are remembered by the system from one command to another because they could become the target for one or more subsequent commands. The stored context is used when a new event is entered without a context word. This supports commands like "TV on," "next channel," and "volume up," where it is not necessary to specify the TV again in the last two commands. Action words describe what is to be done to the object. In the simplest cases, a single action word, such as on or off, is sufficient for commands like "TV on" or "TV off." Multiple action words support commands like "lamp on half brightness," where "on," "half" and "brightness" describe the intended action.

To simplify the discussion of the invention, the following explanations use single-byte addresses, word masks and event templates. This enables up to four context words, four action words, 256 events and 256 different commands to be supported. Multiple bytes can be used where necessary to accommodate the specific corpus and command set used in a particular application without changing the way the system operates.

The recognition process relies on the interaction between event templates that specify the words required to trigger each event, and word masks that convey which words are contained in the input message provided by the user. Each time the Parsing Tree recognizes a word; it generates a pointer to the entry in the Word Pointer Table that represents the word and all of its synonyms. This entry, in turn, points to a string of addresses and word masks that specify the location of each appearance of the word in the Event Decoding Matrix. Each address specifies a row in the Event Decoding Matrix that depends on the recognized word; and the word mask specifies which bits in the event template are to be changed.

Figure 16:
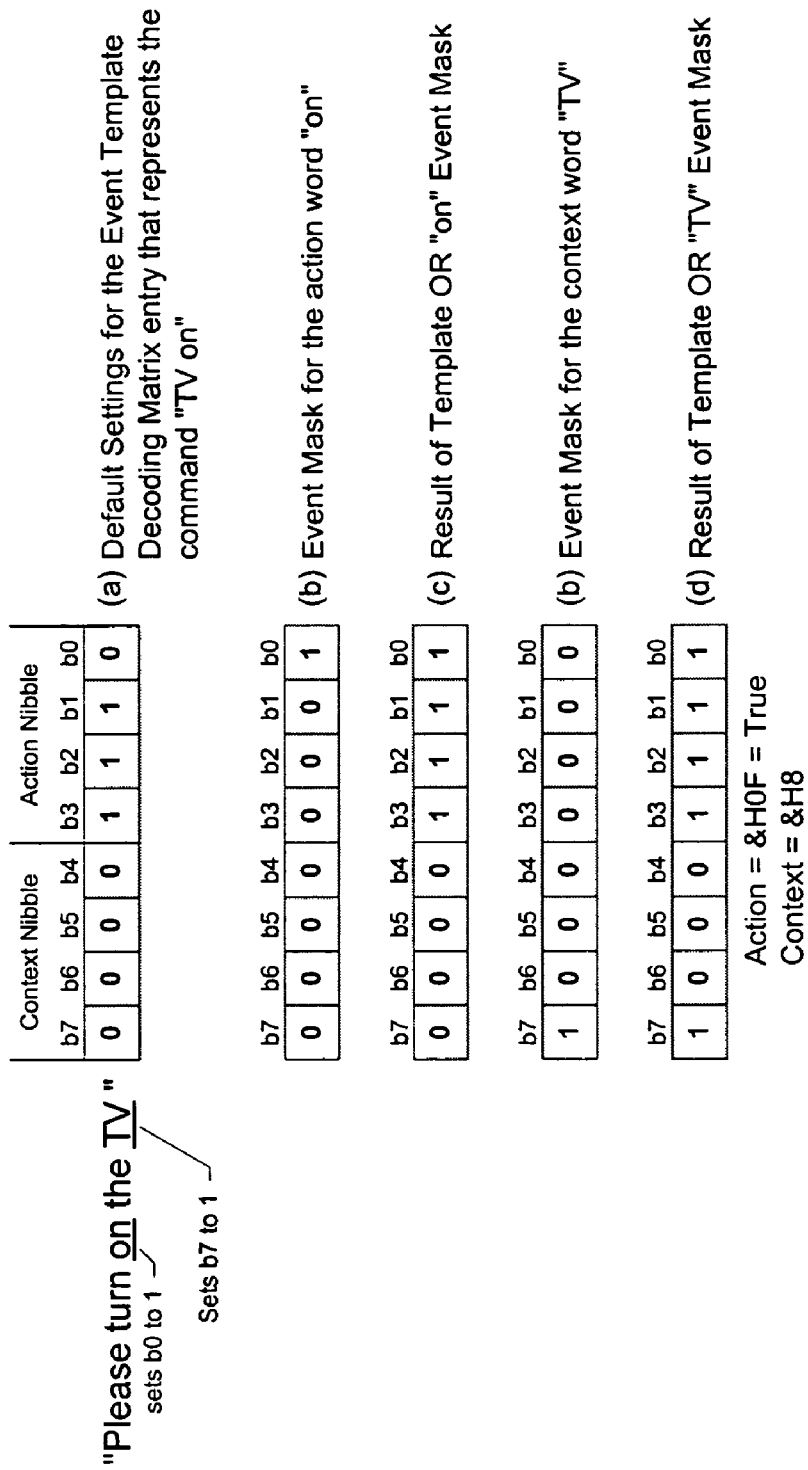
FIG. 16 illustrates the event template and word masks involved in recognizing "TV on," in accordance with an exemplary embodiment of the present invention.
Figure 17:
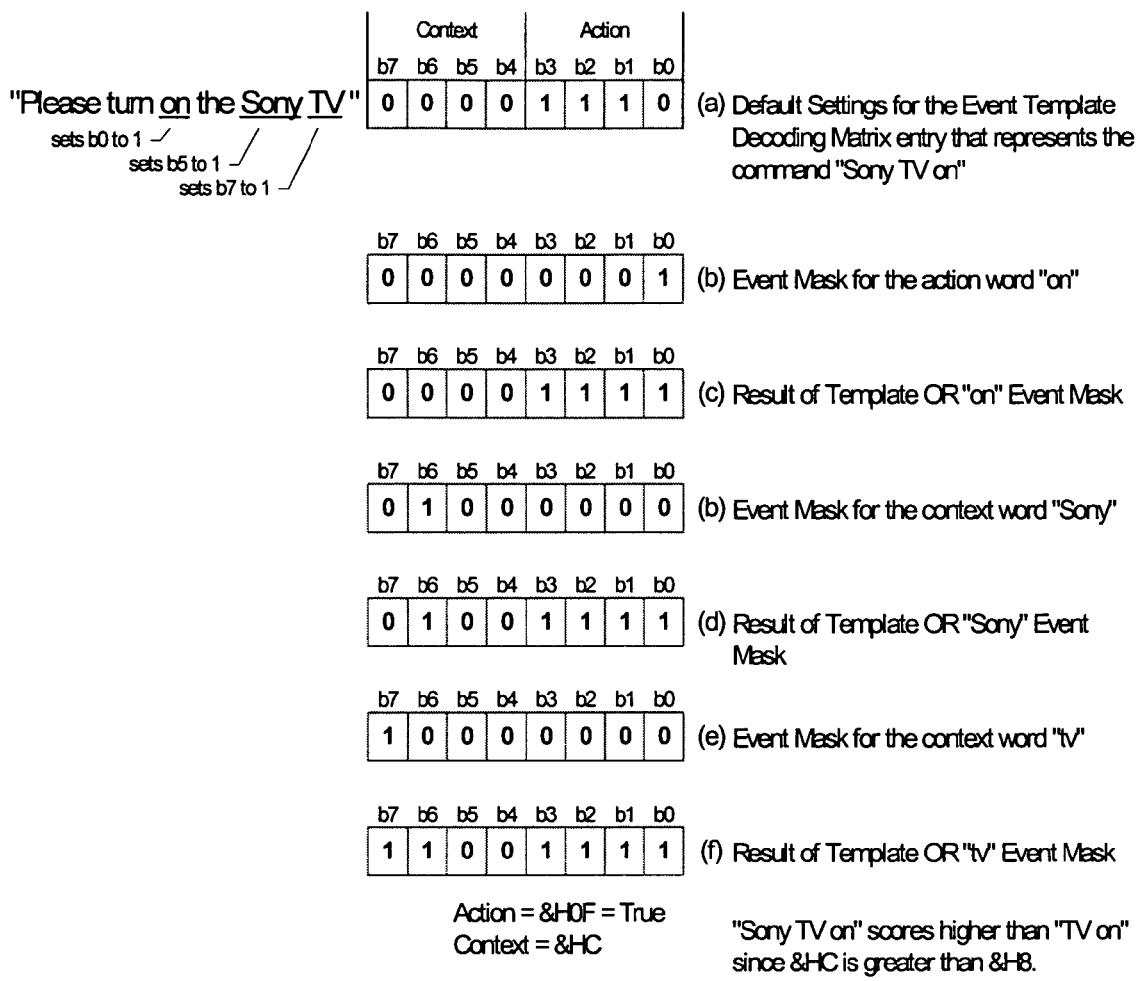
FIG. 17 illustrates the event template and word masks involved in recognizing "Sony TV on," in accordance with an exemplary embodiment of the present invention.

The structure of an event template is shown in FIG. 13. The low-order nibble specifies the required action words and the high order nibble specifies the required context words (objects and qualifiers). For an event to be triggered, all of the specified action words must be received and at least one context word (the primary object that is linked to bit 7). This system correctly distinguishes between commands such as "turn on the TV" and "turn on the Sony TV." The event templates are initialized with all bits in the context nibble set to zero and bits in the action nibble set to zero if a word is required and to one if no word is required. FIGS. 16-18 provide examples of how the event template is configured for a variety of different command requirements. Up to four action words can be accommodated.

A word mask has one or more bits set to one to signify that the word is to appear at that location in the addressed template. FIG. 16 shows how this works for a simple example: "Please turn on the TV". FIG. 16(*a*) shows the initial event template settings for this message. The words "please," "turn" and "the" are filtered out by the Parsing Tree while "on" and "TV" are passed through to the Word Pointer Table. In this particular example, the word "on" is received first from the Parsing Tree and generates the word mask shown in FIG. 16 (*b*). The word mask is logically ORed with the event template and the results are saved in the event template. The word mask is also logically ORed with the context flag to assist later in determining whether a context word has been received.

Figure 15:
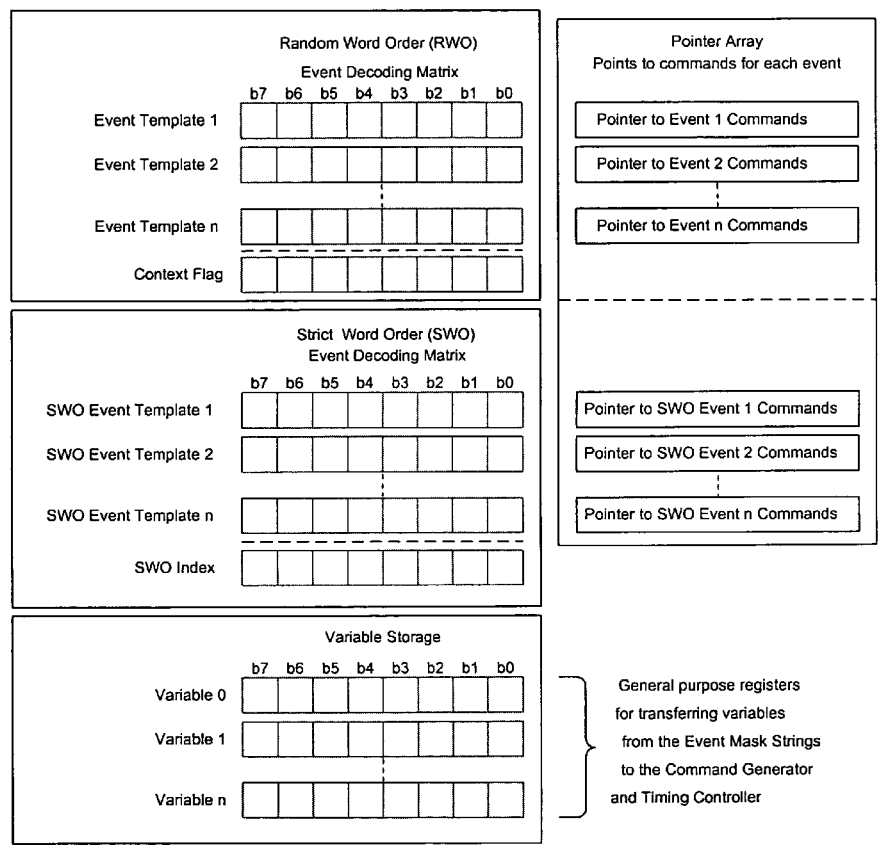
FIG. 15 illustrates the structure of the Event Decoding Matrix in accordance with an exemplary embodiment of the present invention.

As depicted in FIG. 15, the Event Decoding Matrix handles three types of information supplied by the event word-mask strings:
1. events specified by commands in which the words are received in random order and followed by an end of message (EOM) or timeout;
2. events in which the commands must be received with the words in strictly defined order and with no preceding or following words before the end of message character;
3. parameters to be used by particular commands to control timing, number of repeats, step size, and so on.

The address used with each word mask is used to differentiate between the three types of entry into the Event Decoding Matrix. At the time the IMNIP is compiled, the number of variable spaces required, and the number Random Word Order (RWO) and Fixed Word Order (FWO) event templates can be calculated and used to set the range of addresses used for each. The Event Mask String Array simply sends a byte to a particular address and it will be correctly interpreted.

The initial values stored in the event templates are different for each type of event. In Random Word Order (RWO), the high order nibble has all bits set to zero. Context words are linked to the template beginning with the object linked to bit 7 and the qualifiers working downwards from bit 6 to bit 4. The low order nibble has each bit that is linked to a required action word set to zero and all unused bits set to one. In Strict Word Order (SWO), each bit in the byte represents a specific word. Word-one is represented by bit zero, word-two by bit one, and so on. Unused bits are set to one. The SWO index is loaded with &H80 and the SWO candidate is cleared to zero. For parameters, all bits are initialized to zero.

All of the entries in the Event Decoding Matrix are restored to their default settings at the end of each event-recognition cycle. There are two strategies for doing the reset. The first is to copy the complete matrix from read only memory (ROM), The second is to save the address and unmodified event template of each entry that is modified during the event decoding sequence and copy them back at the end of the event decoding process.

The way in which the word mask byte modifies the event template at a specified address differs depending on the address range. In RWO, the word mask byte is logically ORed with the template. Multiple bits can be set at the same time, as with "bedlamp" setting the word "lamp" (object) and "bed" (qualifier). This command could also be received with two separate words: "bed" and "lamp." The word mask is also logically ORed with the context flag and, if this sets bit 7 of the context flag, the address is pushed onto a stack. The stack entries are used when the EOM is received, or the system times out, to retrieve the templates that have a valid object. Only the templates in which the lower four bits are set to one are kept and the template with the highest unsigned value is chosen as the valid command. In SWO, the word mask is logically ANDed with the SWO index. If the result is non-zero, it is logically ORed with the addressed Macro Event Template, otherwise the corresponding bit in the Macro Event Template is set to zero. An SWO event is triggered if all of the bits in the event template are set to one when the EOM is received. The SWO index is shifted one bit to the right each time a new word is processed. For parameters, the variable value stored in the word mask is copied directly to the addressed parameters.

For Strict Order Commands, word order is signified by the location of the corresponding bit in the keyword mask and is detected by performing a logical AND between the keyword mask and a word order mask. A result of one indicates that the keyword is used at that location in the specified command and the corresponding bit in the Command Mask Byte is set to one. The SWO index consists of a byte that is initialized at the beginning of each command message by setting the MSB to one and all other bits to zero. The word order mask is rotated one bit position to the right after completion of processing for each word received from the Parsing Tree. Before each event message is processed, all of the event template bytes are reinitialized with bits that specify a required word set to zero, and all other bits set to one.

Whenever an event is triggered, the Event Decoding Matrix generates a command or macro pointer into a table of Macro and Command Definitions. These pointers are held in the command queue until the target device is ready to accept new commands. The macro pointers and command definitions table is divided into two regions. One region contains definitions for all of the output commands supported by the particular IMNIP. The other region contains macro definition strings that contain groups of command and/or macro definitions which, when activated, are fed into the command queue and are treated the same as those received from the Event Decoding Matrix. The threshold between the two regions is established when the tables are compiled.

Incoming messages to the IMNIP consist of a string of words separated with spaces and terminated with an end-of-message (EOM) character. Whenever an EOM is received, or the delay between inputs reaches a timeout value, the Event Decoding Matrix performs a test to determine whether a complete event has been triggered. If there is a single complete event, the attached command pointer or macro pointer is sent to the command queue. If there is more than one potential complete event, overlapping commands, such as "light on," versus "light on half brightness" are distinguished by selecting the one with the highest numerical value (i.e., unsigned byte or unsigned integer). If there are no complete events, the system checks to see if there is a single event template in which all bits in the context nibble are zero and all bits in the action nibble are set to one. If this condition is met, the context words saved from the previous input message are used to complete the event specification. This allows users to refer to a particular object in the first command they enter and to then omit the name of the object in subsequent commands. For example, the two commands; "turn on the TV" and "tune to channel six" will be decoded as "TV on" and "TV channel six" order in which they are stored in the command decoding matrix. If there is no valid candidate when the EOM is received, the Event Decoding Matrix will do one of three things: (i) immediately reset and wait for a new input message, (ii) delay the reset for a specified timeout period in case more information is provided by another input channel, or (iii) begin an interactive dialog with the user. User preferences establish rules for which option is activated.

Command definition strings are sent to the command generator that builds the payload and destination address information that will be delivered to the output packet manager. The payload can consist of text messages or binary control codes and can include variables provided by the Event Decoding matrix. A timing controller operates in conjunction with the command generator to deliver outputs at specified times or to perform functions such as repeating a command, e.g., a pointer movement, at a specified rate and for a specified number of times. Destination addresses may or may not be present, depending on the particular output command. In many situations, addressing is performed by sending the text names of the intended target device and letting the IMNIP in the target device detect that it is the intended recipient. When known, numeric addresses can significantly reduce the message traffic between IMNIPs.

The address manager is responsible for establishing and maintaining the connection between any pairs of IMNIPs. It can use source addresses provided by the source of a message that is processed by the IM, or it can use destination addresses that are generated by the IMNIP. Every IMNIP has a unique ID number and an optional name that is used whenever it is necessary to validate an interaction with another IMNIP.

The output packet manager builds packets of information and addresses for routing them to the correct destination. Information sources for the output packet manager include: (i) pre-addressed messages that pass through the IMNIP without modification, (ii) merged messages that are formed by combining messages from several sources, (iii) parsed words that are output from the Parsing Tree but will be decoded by the IMNIP in another device, (iv) commands and text messages generated within the local IMNIP, and (v) address data received from the address Manager. The output packet manager assembles packets containing headers, addresses and payload information intended for: (i) higher level IMNIPs or IT devices, (ii) lower level IMNIPs or special interface devices, (iii) the local workspace, and (iv) functions that are internal to the IMNIP or its host IT device.

The Functional components of an IMNIP are shown in FIG. 1. Grouping input 17 and output functions 18 separately, as shown in FIG. 1, reduces the complexity of the IMNIP and leads to a more flexible system than one in which they are intermingled. The input processing section 17 may know a great deal about a user and nothing about the target devices and the output section 18 may know everything necessary to control the target devices but nothing about the users. The IMNIP performs all of the message merging and decoding functions for the ITAS. The IMNIPs required to achieve this can be in separate ITAS devices or they can be combined in one multithreaded system. ITAS devices containing an IMNIP that handle only input functions are called accessors. ITAS devices containing an IMNIP that handle only output functions are called ITAPs. ITAS devices that simultaneously handle input and output functions are called ITAS modules.

Accessors use an IMNIP to reduce the range of words contained in user-generated commands. It achieves this by translating synonyms into words that are contained within the ITAS corpus, and eliminating words that have no meaning within the current context. Each ITAP has an ITAP IMNIP that merges command messages from multiple accessors, decodes individual command words and parameters, and expands multiword macros into sequences of commands.

One way of explaining the operation of the IMNIP is to think of it as a word filter that extracts predefined keywords and macros from messages that are input by the user. This type of word filter is necessary since device designers have no control over the words that might be input by a user while each device requires a specific command for each function it is able to perform. The traditional solution to this problem is to force the user to learn scripts containing the exact words and phrases required to perform each command on each device. Fundamental flaws with this solution include: (i) interaction is not intuitive; (ii) every command requires a separate unchanging script; (iii) there is a steep learning curve; (iv) people are reluctant to learn scripts; (v) different scripts are required for each application; (vi) it is difficult to generate the necessary script by combining multiple input modalities; and (vii) commands that require parameters must have a separate script for each value of the parameter (e.g., "set volume to 5," "set volume to 10," etc.).

Traditional solutions tend to ignore the abilities and preferences of the user by providing a single way to perform each task and requiring the user to memorize the necessary steps.

Figure 3:
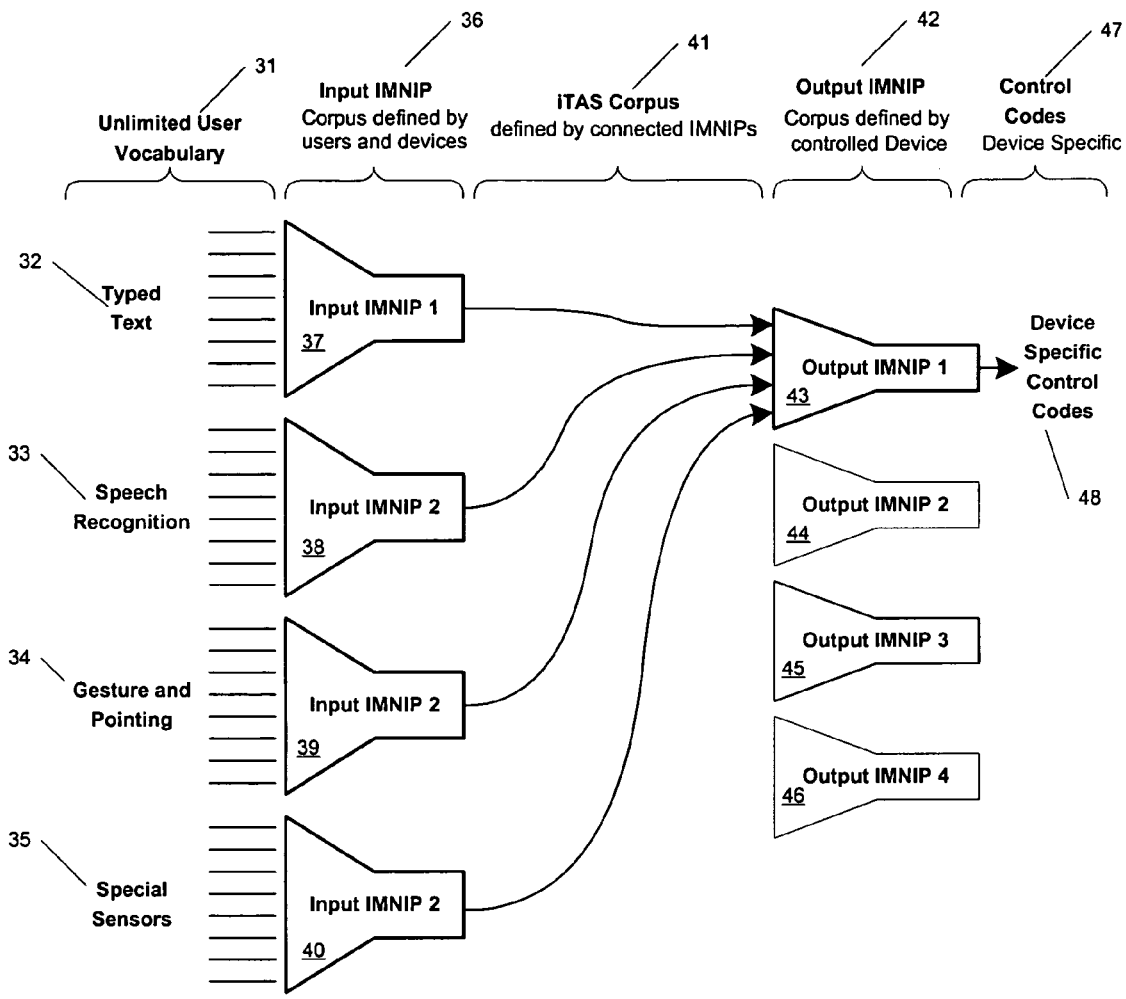
FIG. 3 illustrates how multiple IMNIPs can perform word filtering in accordance with an exemplary embodiment of the present invention.

In contrast, the IMNIP allows users to describe an intended outcome in his or her own words and the system will perform all of the necessary steps without requiring the user to know what those steps are or to participate in their execution. When all combinations of potential users and potential devices are known in advance, a single IMNIP can be configured to cover every anticipated situation. Serial operation of two IMNIPs, as shown by the left-to-right arrows in FIG. 3, enables systems to handle ad hoc combinations of users and target devices. The first set of IMNIPs 36 handle user dependent details 31, and the second set of IMNIPs 43, 42 handle device specific details. Parallel operation of IMNIPs as depicted by the four accessor IMNIPs 37, 38, 39, 40 or the four ITAP IMNIPs 43, 44, 45, 46 in FIG. 3, makes it possible to combine multiple input modalities 32, 33, 34, 35 or output devices 48 without needing to combine and process all of the necessary information to one place. All of the IMNIPs shown in FIG. 3 are functionally identical but each contains a different corpus that is matched to the particular input or output function it performs. The first IMNIP 37 translates familiar user messages 32 into a compact well-defined intermediate text format that can be efficiently and unambiguously decoded by a second IMNIP 43 to generate the control codes 48 required by a particular device.

As depicted in FIG. 3, a user can generate any input word or phrase 31 either directly through typing or speech recognition, or indirectly by pointing or gesturing. After passing the input message though an input IMNIP 37, 38, 39, 40, only words or synonyms that are included in the ITAS corpus 41 will survive. Filtered messages from multiple input accessors 37, 38, 39, 40 can be directed to a single output IMNIP 43 that will integrate the messages into a single stream, extract command words, parameters, and macros, and generate the stream of output control codes 48 necessary to achieve the intended outcome.

Figure 4:
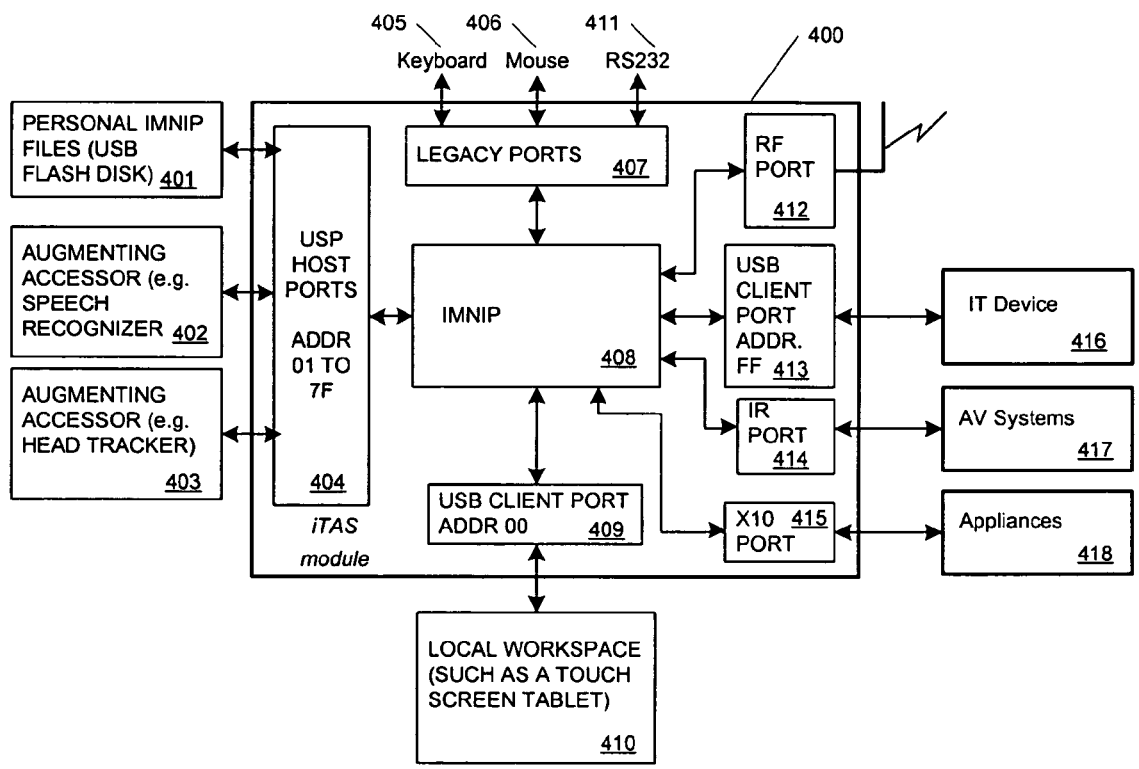
FIG. 4 illustrates an implementation of an ITAS module containing IMNIP components in accordance with an exemplary embodiment of the present invention.

FIG. 4 shows an ITAS module that incorporates an IMNIP 408 and supports all of the currently implemented IMNIP functions. The ITAS module supports a variety of connection protocols. USB is the default protocol for connecting IMNIPs together. Individual USB connections 404 can be replaced by wireless connections where necessary. A selection of legacy protocols are supported to simplify interaction with standard IT devices 416 like PCs. Industry standard IR, RF and X10 protocols are supported for communicating with and controlling IT devices 416 and appliances 417, 418.

Figure 5:
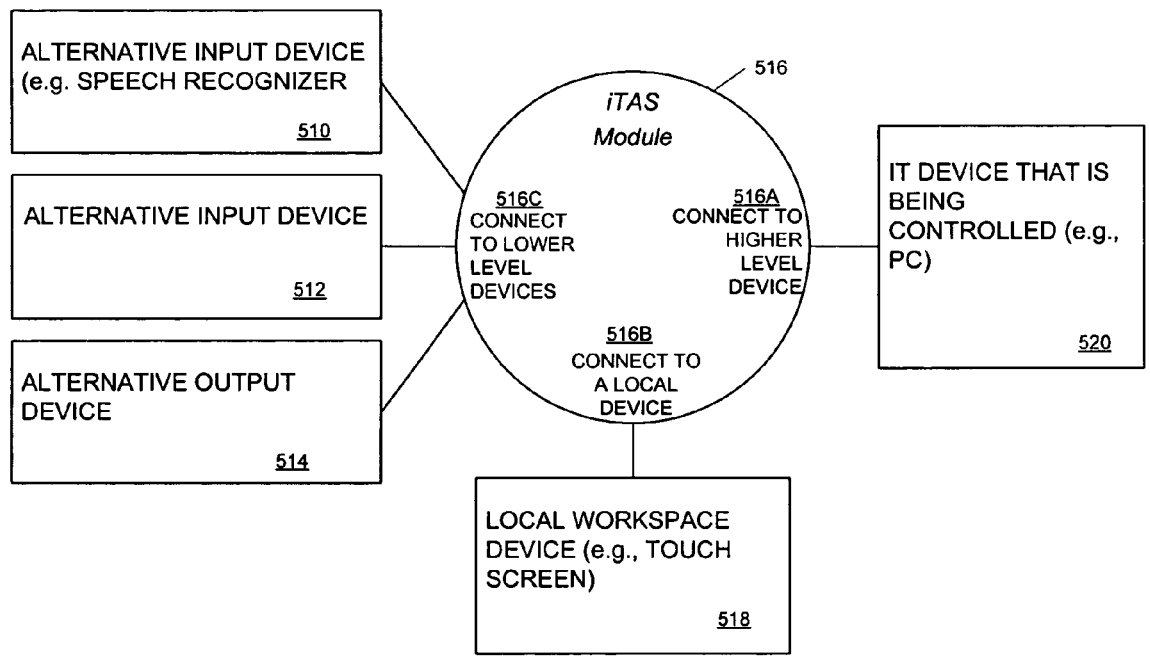
FIG. 5 illustrates how an ITAS module containing IMNIP components can be used to provide disability access to an IT device such as a PC in accordance with an exemplary embodiment of the present invention.

FIG. 5 shows how a single ITAS module 516 can provide access to IT devices 518, 520 for people with disabilities. Multiple downstream (lower level) ports 516C on the ITAS module connect alternative input devices 510, 512 (e.g., speech accessors, head trackers, touch tablets); alternative output devices 514 (e.g., magnified screens, speech synthesizers, Braille displays); and to connect controlled appliances (e.g., lamps, drapes, AV equipment). A single upstream (higher level) port 516A provides access to one IT device such as a PC, ATM or information kiosk. A local port connects to an interactive workspace 516B (local workspace device 518) that serves as the default control panel and feedback display for the disabled user. There are many potential variations to this basic format that let individuals with disabilities choose precisely how they will interact with IT Devices.

Figure 6:
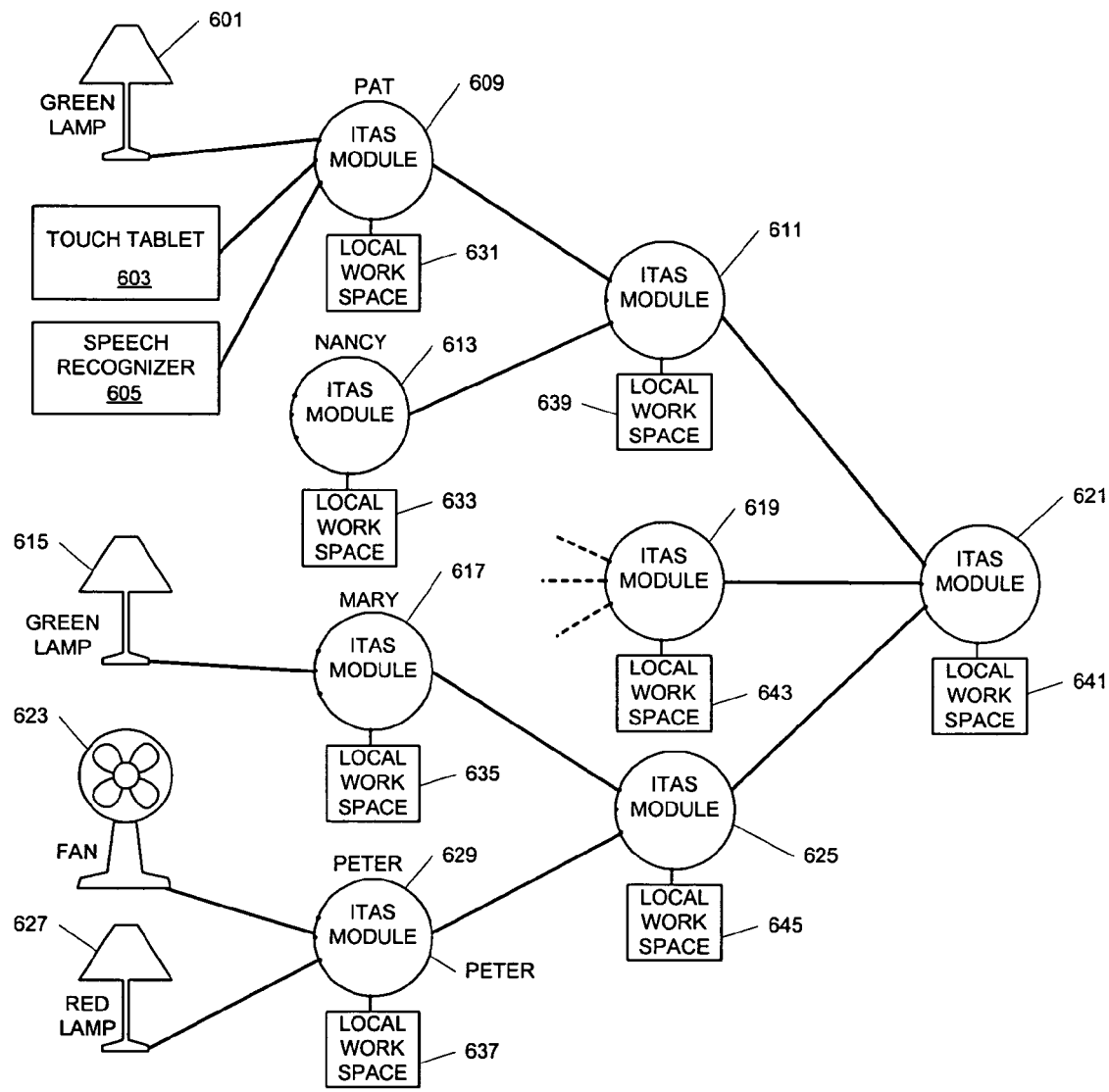
FIG. 6 illustrates how ITAS modules containing IMNIP components are connected to form a distributed control network in accordance with an exemplary embodiment of the present invention.

Multiple IMNIPs provide the framework for building collaborative, distributed-intelligence networks such as the one shown in FIG. 6. Input and output accessors connected to any ITAS module 609, 611, 613, 617, 619, 621, 625, 629 in the network can provide full interaction with IT devices 603, 605, 631, 633, 635, 637, 639, 643, 641, 645 and/or appliances 601, 615, 623, 627 connected to any ITAS module on the network.

The basic topology shown in FIG. 6 provides the framework for individual, small group and large group interaction. This model has been shown to be appropriate for many different learning and working environments and provides significant advantages over traditional networking implementations for applications such as using computers in the classroom, controlling devices and appliances in smart houses, providing universal access to public facilities such as ATMs and information kiosks, providing intelligent interfaces to industrial controllers, and operation of complex software such as 3D CAD. One of the major advantages of an IMNIP-based collaborative network is that there are no centralized tables of resources and addresses. The IMNIP enables sources and targets to identify each other by name or function and when connection is established, to continue the interaction using an address built from the path that connects the IMNIP nodes.

Figure 7:
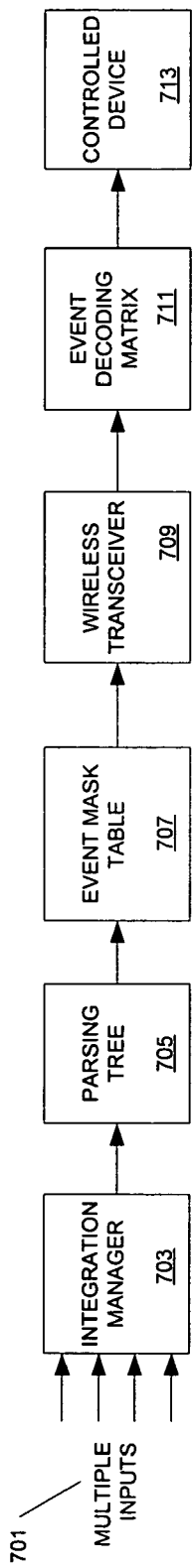
FIG. 7 illustrates the processes performed by an IMNIP in accordance with an exemplary embodiment of the present invention.

The essential processes performed by an IMNIP are depicted in FIG. 7. Multiple text-message inputs 701 are received through the low level ports and combined at a word level by the Integration Manager 703. The Parsing Tree 705 eliminates words that have no meaning within the current operating context and translates synonyms to a single word that is recognized by the system. Each word that is recognized by the Parsing Tree 705 generates a pointer into an array 707 of Event Mask Strings that specifies every use of the word within the commands that are recognized by the particular IMNIP. Each Event Mask String points to a bit location in the Event Decoding Matrix 711 that represents an occurrence of the word being used. The Event Decoding Matrix 711 can be envisioned as a bingo board in which each row represents a potential event and within each row, each column represents one of the words required to trigger the event. An event that is recognized generates a pointer into an array of command and macro definition strings. A Command Definition String triggers a single command by sending a sequence of instructions to a Command Generator that translates them into the correct format for the targeted output device. A macro Definition String specifies a string of commands that are sent to the Command Generator and output sequentially to the targeted output device 713.

Figure 8:
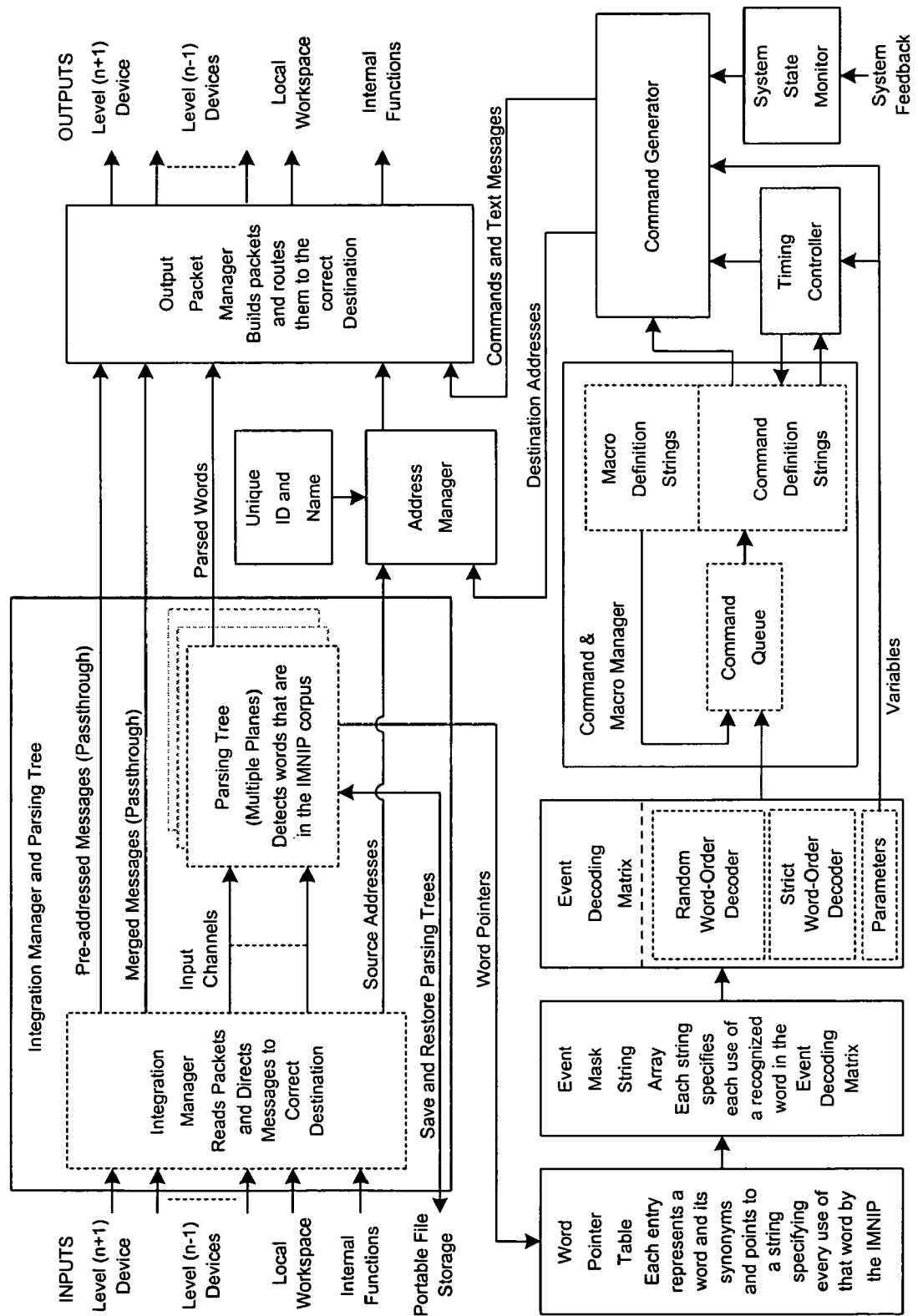
FIG. 8 illustrates the major components of an IMNIP in accordance with an exemplary embodiment of the present invention.

FIG. 8 shows a block diagram of the major components required to implement an IMNP. Operations performed by each block are explained in more detail below. Each row in the Event Decoding Matrix is called an Event Template. The prototype IMNIP uses a byte-wide event template but this can be changed to any size that is necessary to handle different command and vocabulary constraints. Unused bits in the event template are set to one and bits representing required words are cleared to zero.

Accessor IMNIP

Figure 9:
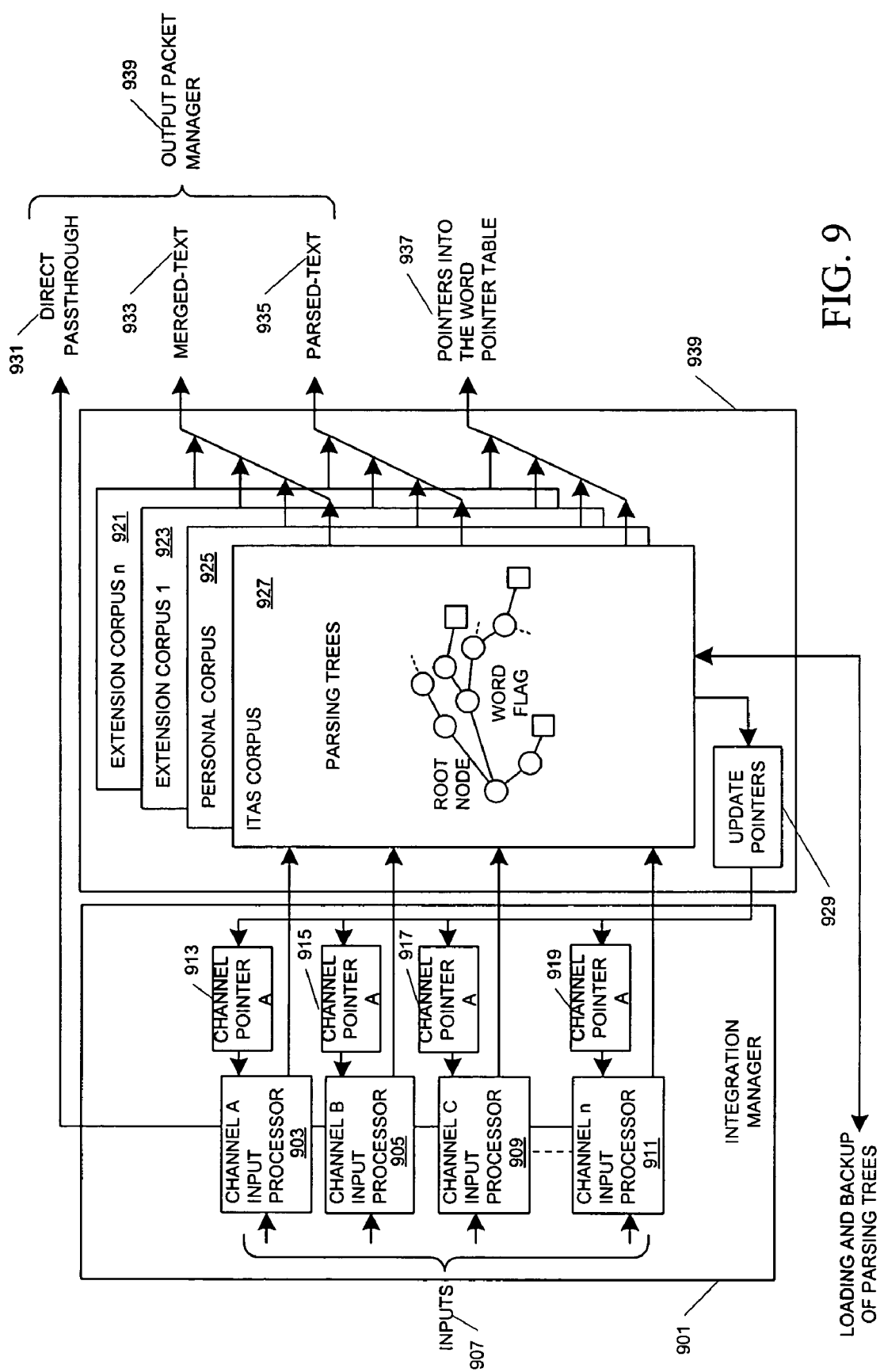
FIG. 9 illustrates the functional components of the Integration Manager and Parsing Trees, in accordance with an exemplary embodiment of the present invention.
Figure 11:
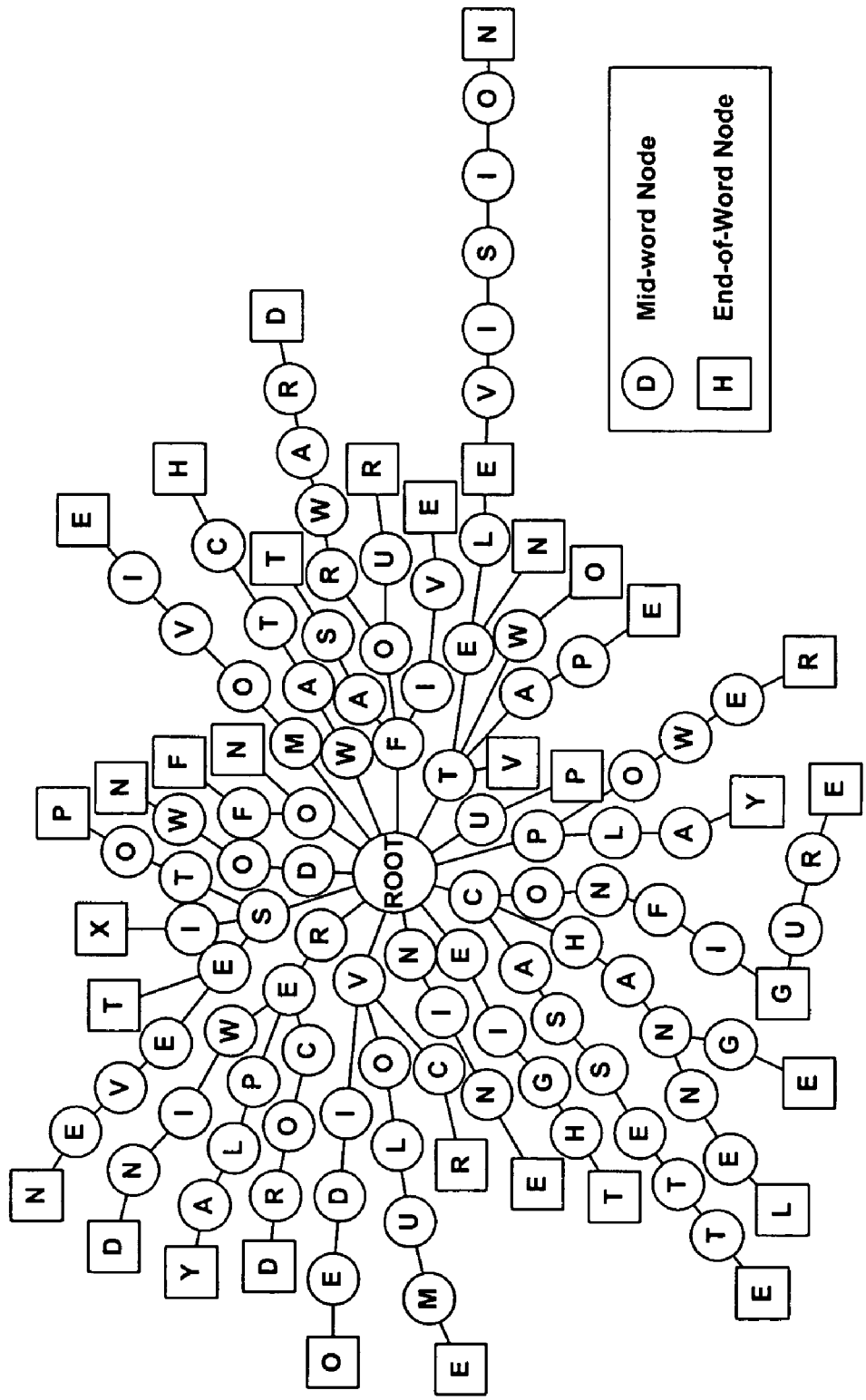
FIG. 11 illustrates a Parsing Tree for a subset of a TV and VCR vocabulary in accordance with an exemplary embodiment of the present invention.

An accessor is a device that uses an IMNIP primarily to process one or more streams of input messages. The Accessor IMNIP, must not only handle unlimited user inputs that may contain many synonyms, it must also be able to pass selected words on to other IMNIs that may be controlling a wide range of target devices, some of which may never have been encountered before. As illustrated in FIG. 9, this flexibility is achieved by providing three parsing trees that are traversed in parallel. Two parsing trees are always present. The first plane contains an application tree 927 having a predefined application-specific corpus (ITAS, in this case) that provides a vocabulary for performing all of the normal ITAS functions. It includes words that are commonly recognized by all IMNIPs, and all synonyms that are commonly encountered within the intended ITAS applications. When recognized, synonyms are translated into their corresponding base word to eliminate ambiguity and to reduce the range of words that must be accommodated by the Event Decoding Matrix. The second plane contains a personal tree 925 having user-specific words and macros, and extensions to the corpus that support special functions on target devices that are permanently available to the user. There can also be one or more extension planes that contain temporary trees 921, 923 having word and macro extensions to the corpus that are added on the fly whenever the system interacts with a new IMNIP. The temporary extension words are not processed by the local IMNIP, but instead are passed straight to the Output Packet Manager that places them in a packet addressed to the other IMIP. The temporary extension trees are discarded at the end of each session. Before they are discarded, the user may opt to transfer the corpus of a temporary tree into the personal tree if the particular target device is to be used frequently Distributing the corpus in this way over several trees minimizes the amount of processing required to maintain the integrity of the permanent corpus while providing the flexibility to extend it at any time.

It is important to understand that each SNIP in a collaborative network, such as the one depicted in FIG. 6, retains full responsibility for recognizing and processing the commands for devices and appliances that are connected to it. When Pat talks to the speech recognizer connected to her iTAS module (in the top left corner of the diagram), she could say "turn on my green lamp" and the local IMNIP would recognize the words my green and lamp and turn on her green lamp since "my" is a synonym for the owner of an ITAS. Saying "turn on the red lamp" would be recognized as on, red and lamp and since the Pat's ITAS module does not have a red lamp connected, it would transmit the message to all of the other ITAS modules. Each module processes the message with its IMNIP and only the ITAS module belonging to Peter, which is connected to a red lamp, will recognize the command and turn on the red lamp. It was not necessary to extend the corpus in Pat's IMNIP in this case since "red" is contained in the standard ITAS corpus. Now consider what happens when the Pat says, "turn on the green lamp." This time the system will find two green lamps, one connected to the Pat's ITAS module, and one connected to the ITAS module belonging to Mary. A message will be displayed on Pat's local workspace saying that two green lamps have been found, one belonging to Pat and one belonging to Mary, and asking the Pat to specify which one should be turned on. At this point there will be a problem because the word "Mary" is not included in the ITAS corpus in Pat's IMNIP, so it will not be recognized by the parsing tree. To prevent this from happening, the message returned from Mary's ITAS module saying that it has a green lamp also includes and an extension Parsing Tree that contains all of the special words required to interact with Mary's IMNIP. Now when Pat says "turn on Mary's green lamp" her IMNIP will generate the message "Mary green lamp on" and send it to Mary's ITAS module where it will be processed by Mary's IMNIP and the green lamp will be turned on. The parsing tree automatically suppresses the apostrophe "s" from "Mary's green lamp."

Outputs Generated by an Accessor IMNIP

The following table shows the relationships between inputs and outputs that can be generated by an Accessor IMNIP.

TABLE 1

| INPUTS | OUTPUT GENERATED |
| --- | --- |
| Individual characters that are not recognized as part of a supported command or macro | Packets containing individual characters that are sent to an addressed device or ITAS module |

TABLE 1-continued

| INPUTS | OUTPUT GENERATED |
| --- | --- |
| Individual words that are not recognized as part of a supported command or macro | Packets containing individual words that are sent to an addressed device or ITAS module |
| Individual words that are recognized as parts of commands | Command packets that will be recognized by the IMNIP in one or more addressed devices or ITAS module |
| Individual words that are recognized as parts of an accessor macro. | Single or multiple commands for controlling the accessor. e.g., "dictate mode," command mode," etc. |
| An IMNIP macro may generate local commands for the host ITAS module, commands for one or more ITAS modules, or new macros for one or more ITAS modules | Single or multiple commands for IMNIPs in one or more ITAS modules |
| | Single or multiple macros for IMNIPS one or more ITAS modules |
| Individual words that represent numerical values | numerical values |
| | Zero - nineteen → add value |
| | Hundred, thousand, etc → multiply by value |
| Individual words that are to be excluded from the messages produced by the IMNIP | No output is produced by the IMNIP |
| Individual words that negate the rest of a message e.g. "Don't turn on the TV | No output is produced by the IMNIP |
| Words ending in apostrophe s such as "Mary's Lamp" | The apostrophe s is suppressed and only the word is sent - Mary lamp |

ITAP IMNIP

Parsing operations are handled slightly differently for input and output IMNIPs. Because there is no way of knowing what a user might say, it is necessary for input IMNIPs to be able to handle a broad range of potential input words. In contrast to this, an output IMNIP is only required to handle words that have been completely defined by the commands that are recognized by the connected appliances and IT devices. A single parsing tree is sufficient for situations in which the IMNIP is permanently connected to one or more controlled appliances and IT devices since they automatically define all of the outputs that are to be generated by the IMNIP. If a new permanent IT device is added, it is necessary to recompile the IMNIP to incorporate any new commands. If devices are attached in an ad-hoc manner, the device must provide an extension parsing tree defining any additional commands that it recognizes.

Accessor and ITAP Configurations

Accessors and ITAPs can be individually designed to match the level of complexity that is to be handled in a particular application. Any level of accessor can operate with any level of ITAP. Not all capabilities will be available in all cases.

TABLE 2

| ACCESSOR | ITAP |
| --- | --- |
| Small Accessor | Small ITAP |
| Small, portable, low power, embedded processor | Intelligent interfaces for small appliances and lamps |
| Switch accessor | PC interfaces with minimal macro support |
| Morse Code accessor | |
| Motion sensing accessor | |

TABLE 2-continued

| ACCESSOR | ITAP |
| --- | --- |
| Mid-Level Accessor | Standard ITAP |
| Portable device such as handheld or notebook computers or high performance embedded processors User dependent speech accessors with medium size vocabularies. Intelligent video sensors for simple gestures | House ITAP controlling groups of similar appliances PC interfaces with high-level macros for applications such as Word. |
| High-Level Accessor | Specialized ITAP |
| Fast notebook, desktop and high-performance embedded processors Large vocabulary, user independent speech recognition Image recognition sensors for complex gestures | ITAPs designed for proprietary systems Complex CADD systems Industrial control systems |

Accessor IMNIP

User Inputs

Accessor IMNIPs use input modalities such as keyboards, pointing devices, motion detectors, gesture recognizers and speech recognizers to detect user actions. All inputs are received as strings of characters, numbers or words. A separate input channel is used for each modality.

Input Processors

Each input channel uses appropriate processors to detect desired input actions and translate them into strings of characters, numbers or words.

Channel Pointers

Each input channel has a channel pointer that points to the current node in the Parsing Tree that is being transversed. When a channel is inactive, its channel pointer defaults to the root node of the particular Parsing Tree. The pointers can only move away from the root note at the beginning of a new word. The pointers are moved back to the root node if a word is successfully completed or if there is an unsuccessful match for a new character at the current node.

Parsing Trees

An accessor IMNIP has two permanent Parsing Trees and one or more extension parsing trees that are traversed in parallel. Each word in a parsing tree begins at the tree's root node and is terminated by a flag that points into the Word Pointer Table. Each group of synonyms points to a common entry in the Word Pointer Table. Each entry in the Word Pointer Table is a pointer into the Event Mask String Array.

Event Mask String Array

The event Mask String Array contains strings of address bytes and word masks. Each string points to the location of every occurrence of a particular word in the Event Decoding Matrix.

Text Buffers

The merged text that is fed to the Parsing Trees and the resulting parsed text are each stored in Text Buffers that are used when it is necessary to send text messages directly to another IMNIP.

Current-Message Pointer Buffer

For each event, the word pointers generated by the Parsing Tree are stored in the Current-Message Pointer Buffer.

Previous-Message Pointer Buffer

After a new event has been triggered, the contents of the Current-Message Pointer Buffer are moved to the Previous-Message Pointer Buffer. The contents of the Previous Pointer buffer are used to recreate the context of the previous message when a new message has valid action words but no context words.

Event Decoding Matrix

The Event Decoding Matrix contains a word mask byte for each command that can be generated by the IMNIP.

Command Queue

The Command Queue assembles individual command pointers into the correct order to be sent to the Command Definition String Array.

Output Packet Manager

The Output Packet Manager loads text, commands and target names/ID into ITAS message packets.

ITAP IMNIP

Device Address and Names Buffer

Every IMNIP has a unique address and one or more descriptive names. These are stored in a buffer that is copied to each accessor at the time it is connected.

Extension Word Table

When an ITAP is connected to an accessor, it is necessary for the accessor to know all of the words and macros that are recognized by the particular ITAP. Most of the required words are included in the standard accessor corpus so it is only necessary for the ITAP to send extensions to the accessor. No meanings are supplied to the accessors along with the extension words.

Channel Pointers

Each channel pointer indicates the node in the Parsing Tree that represents the most recent character decoded for each incoming message.

Parsing Tree

The corpus of an ITAP Parsing Tree contains all words that are recognized as commands or macros by the specific ITAP. A recognized word points into a Keyword Mask Pointer Table.

Keyword Mask Pointer Table

Each entry in the Keyword Mask Pointer Table points to an entry in an array of Keyword Mask Strings that specify all outputs that are dependent on each recognized word.

Command Decoding Matrix

The Command Decoding Matrix contains a byte that defines all of the keywords required to trigger each of the output commands that can be generated by the IMNIP. An output command is generated when all of the necessary words have been recognized by the Parsing Tree. Some commands require the words to be received in fixed order.

Command Buffer

A pointer is placed in the Command buffer whenever the command decoding matrix recognizes a command.

Command Definition Table

The Command Definition Table contains pointers into an array of Command Definition Strings or into an array or Macro Definition Strings.

Command Definition String Array

Command Definition Strings specify the actual codes that are sent to the target device to perform a required command Macro Definition String Array Macro Definition Strings specify groups of commands or macros that are to be decoded by command definition strings and sent to the target device.

Output Command Generator

The Output Command Generator controls the assembly and timing of the codes that are sent to the device that is controlled by the ITAP.

Parsing Tree

Figure 10:
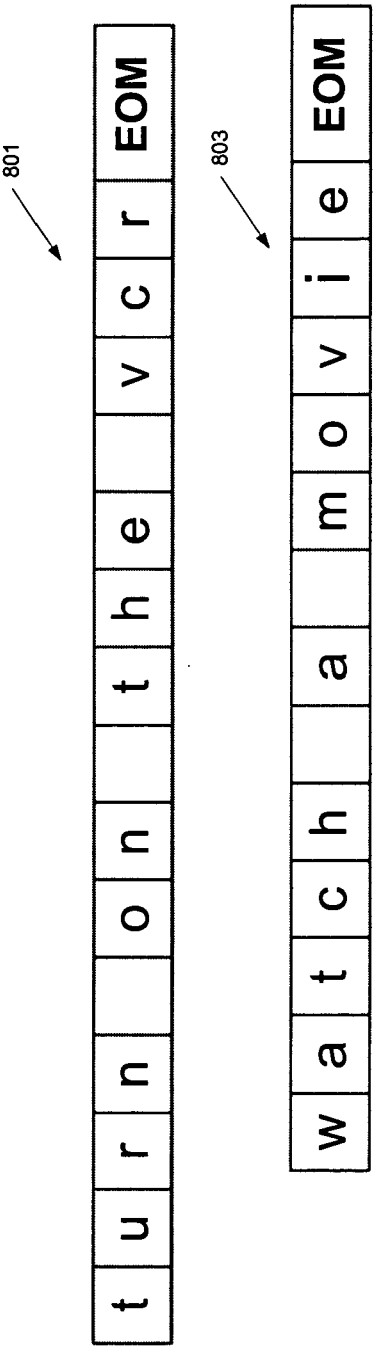
FIG. 10 illustrates examples of input messages to the Parsing Tree, in accordance with an exemplary embodiment of the present invention.

The Parsing Tree receives input messages as a string of words separated by spaces and terminated by an End of Message (EOM) character. Either the string may represent a single command entered on the fly by the user, or it can be a predefined macro that represents a complete sequence of commands for performing a specified task. Some commands and macros accept words in any order and some require the words to be entered in a defined order. Every word in a macro must be entered in the correct order for the macro to be recognized. FIG. 10 provides an example of a normal command message (a) that instructs the system to perform a single command that turns on the VCR and a macro (b) telling the system the user wants to watch a movie. The macro is translated into a sequence of commands that might turn on the TV, select the user's favorite movie channel, adjust the volume, close the blinds and dim the room lights. The words in a command may be received in any order and all unrecognized words are automatically ignored. The command will fire as soon as all of the required words are received. In the case of a macro, however, the words must be received in exact order and the message cannot include any preceding, embedded, or trailing words.

An accessor IMNIP has three or more Parsing Trees that are traversed in parallel. The first is an application tree containing a predefined application-specific corpus (e.g., ITAS) that provides a vocabulary for performing all of the normal system functions. It includes words that are commonly recognized by all ITAPs, and commonly encountered synonyms. Synonyms are translated into their corresponding base word to reduce the range of words sent to the ITAPs. The second is a personal tree containing user-specific words and macros, and extensions to the corpus provided by ITAPs that are permanently available to the user. Additional parsing trees and temporary extension trees containing word and macro extensions to the corpus that are added on the fly whenever the system interacts with a new ITAP. The contents of the temporary extension trees are usually discarded at the end of each session but the user may opt to transfer its contents to the personal tree if the ITAP is to be used frequently. Only one parsing tree is required for the IMNIP in an ITAP since all of the words and macros recognized by a particular ITAP are known prior to compilation of the ITAP software.

The three (or more) parsing trees contain all of the words that are used by commands, macros, and target names in the connected ITAPs. The example shown in FIG. 10 contains basic words for controlling a TV and VCR. Each word begins at the root node of the tree. Individual words are shown as strings of characters enclosed by circles. The end of each word is designated by enclosing the character in a box that signifies a pointer into a Word Mask Pointer Table containing the address of a Word Mask String that defines all actions that are dependent on that word. Each character in an incoming message is applied to each of the Parsing Trees as soon as it is received. The operation is identical for all of the parsing trees and can be summarized as follows:

1. an alphanumeric character is compared to the next character contained in any branch attached to the current channel pointer;
    (a) if a match is found, the channel pointer is set to point to the new node;
    (b) if a match is not found, the channel pointer is reset to the root value and a flag is set to inhibit any further searches on that channel until a space character is received indicating the end of the current word and possible start of a new word;
2. a space character indicating the end of a word;
    (a) if a pointer into the Word Mask Pointer Table is attached to the node currently pointed to by the Channel Pointer, the indicated Word Mask String will be activated;
    (b) the Channel Pointer is reset to the root node of the parsing tree regardless of whether a Word Mask String is activated;
3. an EOM character indicates the end of a message;
    (a) if there is a Word Pointer attached to the node currently pointed to by the Channel Pointer, the indicated Word Mask String will be activated;
    (b) the Channel Pointer is reset to the root node regardless of whether a Word Mask String is activated.
    (c) The Context Word that is stored in the Context Pointer is applied to the Word Mask String Array to activate any valid command that may have been received.
    (d) The word "my" is treated as a synonym for the owner of the accessor if it is recognized as a part of a command or macro.

Keyword Mask

Figure 12:
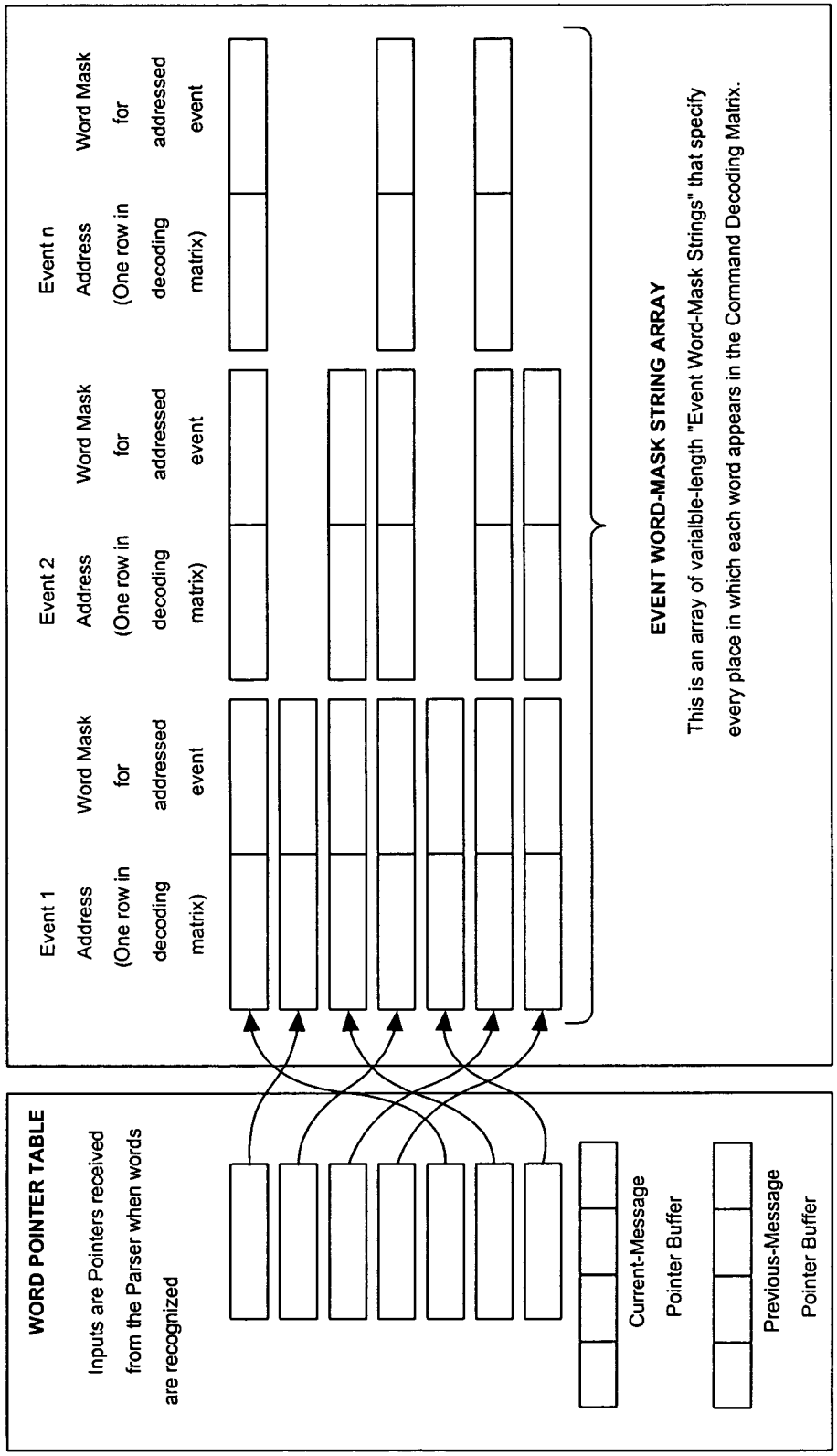
FIG. 12 illustrates a structure of the Word Pointer Table and the Event Word-Mask String Array in accordance with an exemplary embodiment of the present invention.

The Keyword Mask has two components: (i) an address offset table that points to strings in an array of Keyword Mask Strings; and (ii) an array of variable length strings containing byte pairs that specify address and bit patterns for defining keywords in the Word Decoding Matrix The structure of the Word Mask is shown in FIG. 12. Each word in the Parsing Tree that is required in the description of an output command has a pointer to one entry in the Keyword Mask Pointer Table. Synonyms all point to the same entry in the Keyword Mask Pointer Table.

Command Decoding Matrix

The Command Decoding Matrix contains a definition byte for each supported output command. The bits within each definition byte specify particular keywords that are required to trigger the particular output command. Up to eight keywords can be associated with each output command. This can be increased in multiples of eight. Whenever an output command requires less than eight key words, the unused bits in the keyword mask are set to zero. The order in which words are associated with the bits in the keyword mask indicate the weighting of the word. Bit 7 of the definition byte has the highest weighting and bit 0 has the lowest weighting. Whenever all the bits in a Keyword Mask byte become zero, the Command Decoding Matrix sends a command code to the Command Queue. If an EOM is received without a command being triggered, all keyword mask entries that have been modified are evaluated to determine if the weighting of the modified bits indicates a close match. Messages may be sent to the user to disambiguate close matches. The Command Decoding Matrix also provides temporary storage for variables that are used to pass pre-stored settings such as channel number or volume settings to the output command generator.

After each command is sent to the command queue, the Command Decoding Matrix is reset to its default values by copying a stored image of the default keyword mask values. The context of the Command Decoding Matrix can be made persistent from one command to another by remembering the keyword that specifies the context of the command. For example, the command "Turn on the TV" automatically sets the context to "TV." Until the context is changed or turned off, subsequent commands, such as, "channel up," will be sent automatically to the TV. Some keywords are designated as context words that specify a particular object or activity that could become the target for one or more subsequent commands. Context words are designated by the position of their corresponding entry in the Keyword Mask Pointer Table. Entries below a preset threshold address are non-context words while those above the threshold are context words. Non-context words are processed immediately but the processing of a context word is deferred until all of the other words in a user message have been received and processed. This is achieved by obtaining its pointer from the Word Mask Pointer Table and storing it in the context pointer and processing it after the EOM is received. The context pointer is not reinitialized at the start of each message. New command messages that do not contain a context word will use the same context as the preceding message. Messages containing a new context word automatically update the context pointer. When multiple ITAPs are in contention for executing a command from an accessor, it is essential that all of the ITAPs that do not own the command do not attempt to execute the command with a previously stored context word. The accessor prevents this from happening by resetting all of the context pointers immediately before sending a new context word. The reset is performed by transmitting a dummy context word that is recognized by all of the Parsing Trees but not used in any valid command. All of the ITAPs receive the dummy context word and load it into their context pointer. The real context word is accepted only by the intended ITAP.

FIG. 16 shows how the Command Decoding Matrix recognizes the message "TV on" from the sequential recognition of "TV" and "on." The input command may contain additional words such as "Please turn on the television set" that are filtered out by the Parsing Tree to leave only "TV on." Synonyms for TV, such as tele or television, map to the same bit in the Command Decoding Matrix.

Assume the "TV on" command is decoded by Keyword Mask String X:

1. the word "TV" generates the Keyword Mask Pointer for Keyword Mask String X and since TV is a context word, stores it in the context pointer to be used after the EOM is received;
2. the word "on" generates Keyword Mask Pointer that points to a Word Mask String that contains a pointer to the row in the Command Decoding Matrix that represents the command for TV on and a keyword mask value of OxBF that is logically ANDed with the current Command Mask to clear bit 6 without disturbing any of the other bits.
3. The accessor sends an EOM to signify the end of the command message.

When the EOM is received by the ITAP, the context pointer is used to select the Word Mask String corresponding to the context word TV. This string contains a pointer to the row in the Command Decoding Matrix that represents the command for TV on and a keyword Mask value of Ox 7F that is logically ANDed with the current Command Mask to clear bit 7 without disturbing any other bits.

Fixed Word Order (FWO) Commands

Fixed Word Order commands require more operating rules than the Random Word Order Commands, as follows:

1. a FWO command must start at the beginning of a message;
2. FWO commands must be terminated by an EOM;
3. the words in a FWO command must match both the content and the order;
4. the FWO command process described herein supports a maximum of eight words but can be scaled to any length in multiples of eight words;
5. some events, such as cancel, are executed immediately to enable a user to override or cancel a macro before it has completed its execution.

A FWO command must contain a specific group of words arranged in the correct order. Word order is checked by matching the bit position of the word indicated by the Keyword Mask against a word index that keeps track of word order. The word index byte functions as a shift register that begins each macro testing sequence with a one in the MSB. Each time a valid word is detected, the word index byte rotates one bit to the right, injecting a leading zero. Each time a word is indicated by the macro mask, the time slot is checked by doing a logical AND with the word index. The corresponding bit in the Macro Decoding Mask is cleared only if the AND operation results in a nonzero value. The first word in a FWO Command corresponds to the MSB of the Word Index.

The position of a word is indicated by the position of bits that are set to one in the macro mask. In most cases, a word will appear only one time in a macro but multiple bits can be set in the macro mask if it is necessary for the same word to appear more than once. The AND function checks for only one bit at a time by automatically filtering out the additional bits.

The macro detection process is similar to the event detection with the addition of the word order tests. The Macro Decoding Matrix is initialized to its default values prior to each detection sequence. Required words are indicated by setting the matching bit in the macro decoding mask to one. All of the other bits are cleared to zero. A macro is recognized when all of the bits in a macro decoding mask byte are set to zero and the last detected word is followed by an EOM. A macro candidate pointer is loaded with the address of any macro decoding mask byte that goes to zero.

An accessor macro must be entered exactly as it is defined, beginning with the first word of the message and ending with an EOM. When entering an ITAP macro, however, the user may add non-macro words before, in the middle, or after the macro. A two-stage word filtering process occurs because the accessor IMNIP eliminates non-macro words and the ITAP IMNIP decodes the macro. The following examples explain how this occurs.

TABLE 3

| Input to Accessor | Output of Accessor | Related ITAP Macros | Result |
|---|---|---|---|
| I want to record the news please | record news | Record news<br>Record news now<br>Record news channel | The VCR records the news on the default channel at the default time for default duration. |

TABLE 3-continued

| Input to Accessor | Output of Accessor | Related ITAP Macros | Result |
|---|---|---|---|
| Please record the news now | Error! Not a valid link. Now | Record news Record news now Record news channel | The VCR immediately begins recording the news on the default continuous news channel. |
| I want to record the news on channel five at six o'clock | record news channel EOM on 5 at 6 EOM | Record news Record news now Record news channel | The VCR begins recording channel 5 at 6:00 for the default "news" duration. |

Processing the previous examples involves the following steps:

I want to record the news on channel five at six

The Parsing Tree eliminates words not in the corpus:

I record news on channel five at six

Parameters are extracted to leave the ITAP macro. Numerical words are converted to numbers:

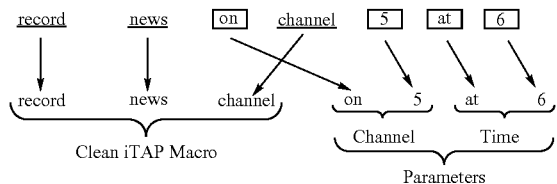

The previous examples also demonstrate the need to distinguish between similar macros such as "record news," and "record news now." When the words "record" and "news" have been processed, the macro "record news" will be indicated as a macro candidate. However, it will only be recognized as a valid macro if the next character is an EOM. Anything other that an EOM will cancel the macro candidate status.

Macro Processing

The IMIP's ability to process embedded macros is a major breakthrough. Existing macro processors require the user to speak a macro exactly as it is defined. Any parameters that must be provided by the user must be supplied in a separate utterance or message. This leads to stilted and unnatural interaction that is difficult to remember.

The IMNIP enables a user to insert filler words or parameters before, during, and after a macro. The formal macro for instructing an AV system to record the news on a particular channel at a specific time might consist of "record news channel." If this is all that is received by an ITAP, it will incorporate a default channel number and the default time for the news on that channel. However, if the user says, "Please record the news on channel five at six o'clock," the system will decode the channel and time and insert them into the appropriate places in the output event queue. The accessor IMNIP automatically blocks the preceding "please." There are several unique advantages of the IMNIP macro processor:

1. it eliminates the need to store complete macro strings;
2. macros are decoded incrementally;
3. macros and single commands are entered into an output event queue that establishes the correct order of execution of output commands;
4. the user doesn't need to specify the beginning or end of a macro;
5. normal commands and macros are decoded in parallel and if a macro is not completed within a single input message, any pending single word commands will be executed.

Commands are still recognized while a macro is being executed and can provide the user with ways to insert parameters, cancel or override the macro.

Output Event Generator

The output event generator generates output events that are sent to the target device and the system state monitor tracks the state of the target system. Individual outputs are programmed to match the specific command structure of the target system. Where necessary, variables representing settings, such as the channel number, are retrieved from parameter storage registers in the Event Decoding Matrix. Sequences of output events, such as repeated mouse movements, are initiated by a task command from the Task Decoding Matrix. The stream of automatic output events can be terminated by: (i) receiving another command from the Task Decoding Matrix; (ii) completion of a specified number of cycles; or (iii) a timeout. Placing the Macro String Table after the output event queue minimizes the amount of RAM buffering required for the output event queue since the output events specified by the macro can be read from non-volatile memory.

Toggling Commands

Toggling commands can present a problem if the user gives a command such as "turn on the TV" when it is already on since this would result in it being turned off. This erroneous action can be prevented if the system is able to monitor the current state of controlled appliances and devices. The System State Monitor receives state feedback from controlled devices or auxiliary sensors and maintains flags that reflect the current state of devices that incorporate toggling controls. The Command Generator uses these flags to inhibit a toggling command if enacting it would result in the wrong action.

A single input message may contain more than one event tied together by the word "and" as in "turn off the stereo and turn on the TV." The word "and" is recognized by the Parsing Tree and the word pointers for the rest of the command are buffered until the part that precedes the "and" has been decoded and either triggered an event or was discarded. The stored word pointers are reactivated and processed as a normal message. An input IMNIP that is sending messages to another IMNIP would transform a message such as "turn on the TV and select channel 5" into two separate messages "on TV" and "channel 5 TV," that are sent sequentially. The normal process for maintaining context inserts "TV" as the context for the second message. This decoding automatically handles multiple actions on the same device.

Maintaining Context

An IMNIP maintains the context from one event to the next so that a user is not forced to keep saying the name of a device when giving a sequence of commands such as: "TV on," switch to TV channel five, "Turn TV Volume up." By automatically maintaining the context, the IMNIP allows the user to use more natural commands like: "Turn on the TV." which is reduced to "on TV," and the context is set to TV. Now the user can say "switch to channel five" or "volume up" and the commands will automatically apply to the TV.

Because all of the decoding is performed with forward pointers it is not possible to use backtracking to determine which words actually generated an event. It is therefore necessary to recreate the context each time it is required by reenacting the previous event selection using the pointers stored in the Previous-Message Pointer Buffer. The Event Decoding Matrix determines whether this is necessary while it is searching for valid commands at the end of an input message. A normal event that contains its own context has an action nibble with all of the bits set to one and a context nibble with at least one bit set to one. If there is no potential event but there are event templates with completed action nibbles, the Event Decoding Matrix will initiate another pass through the decoding sequence using the word pointers stored in the Previous-Message Pointer Buffer. This time however, the event templates are not reset first and the action nibble is masked out to zero on all of the word masks. In this way, the actions intended by the current input message are merged with the context words from the previous message. If the new decoding sequence results in a valid event, it is completed in the usual manner except that the Current-Message Pointer Buffer is not transferred to the Previous-Message Pointer Buffer, thereby maintaining the context for the next decoding cycle.

Loading Information into the IMNIP

The behavior of the IMNIP is controlled by information that is distributed throughout the system in the form of words in a parsing tree, numerous tables pointers and word masks. The following sections describe an interactive strategy for collecting and loading the necessary data.

The basic function of the IMNIP is to translate natural language commands into output events that cause a pre-defined operation on the target device. Speaking, typing or writing, "Turn on the TV" generates an output event in the form of an IR command that turns on the TV. The IMNIP achieves this by recognizing the words "on" and "TV." Each word that is recognized sets bits in a task-decoding matrix that maps each input word to all output events that depend on it. The words that make up a command may come from a single source such as a speech recognizer or from multiple sources. For example, a person might use a head tracker to point to a picture of a TV on a computer-screen menu and then say, "Turn that on."

The devices that are controlled by an IMNIP define the words that are recognized by that particular IMNIP. Each IMNIP has a default corpus containing the generic words for the type of tasks that are to be performed. Whenever a new device is connected to the IMNIP, it is necessary to define any additional words that will be necessary for controlling the device. It is also necessary to define the content and format of all output events that must be generated to control the device. The scenario described below in Table 4 provides an example of the procedure required for installing a new device and adding words to the corpus.

For this example, it is assumed that the IMNIP is part of a house ITAP configured to control lamps and appliances in several rooms in a house. The residents in the house have purchased a new Tiffany lamp for the living room and want to be able to turn it on and off and control its brightness through their speech activated ITAS home control system.

TABLE 4

| | REQUIREMENT | | ACTION |
|---|---|---|---|
| Step 1 | Add a new controlled lamp to living room | a. | Purchase a lamp and X10 lamp controller |
| Step 2 | Test the lamp and x10 controller | a. | Set the X10 controller codes to A0 and plug into an AC outlet, plug the lamp into the X10 controller |
| | | b. | Check the operation of the lamp using the test facility on the smart house control systemt |
| Step 3. | Load information about the lamp into the control system Use local workspace attached to the IMNIP, or Use notebook or handheld computer as a temporary control panel | a. | Enter type of device into the system from list of options - e.g., lamp |
| | | b. | Specify the functions that are to be supported - e.g., on, off, fade, dim, brighten, set-to, and preset levels |
| Step 4 | Select from a list or enter a unique name for the new lamp and enter any applicable aliases | a. | Specify a primary name for the lamp - e.g., "Tiffany" |
| | | b. | An alias might be - "table" |
| Step 5 | The controller and X10 module must be connected to the same house wiring circuit | a. | Specify the location in which it is to be used - e.g., living room |
| | | b. | Select most convenient outlet from on screen blueprint of house wiring |
| Step 6 | Set the house code and device code on the X10 module | a. | The system specifies a unique address that is to be set in the X10 controller |

The system uses the information entered by the user to: link to words already in the Parsing Tree, add new words into the Parsing Tree and link to them, modify the Word Pointer Table Strings where necessary, build new entries in the Event Mask String Array. Create new event templates in the Event Decoding Matrix, and create pointers that link the new event templates to appropriate commend definitions. Table 5 provides examples of system actions.

TABLE 5

| | REQUIREMENT | | SYSTEM ACTION |
|---|---|---|---|
| Step 1 | Create a new entry in the Output Event Generator | a. | Copy lamp control template |
| | | b. | Add logic for any required additional functions |
| Step 2 | Build new entry in the Task Decoding Matrix | a. | Create new entry |
| | | b. | Set pointer to the Output Event Generator |
| Step 3 | Check each keyword that is to be used to control the lamp against words already in the Parsing Tree | a. | If the word is already in the Parsing Tree, add a new address and word mask definition to existing Event Mask String |
| | | b. | If the word is not in the Parsing Tree create a new Task Mask String for each new word |
| Step 4 | Adjust or add all necessary pointers | | |

Predictive Completion

The Parsing Tree can also be used to predict words within its corpus. As the user enters characters, the system can respond with a list of possible commands and provide short-cuts that enable the user to select the desired command or macro after entering only a few characters. The following table provides four examples of how the Parsing Tree decodes numbers.

TABLE 6

| Recognized Input | System Action | | Result |
|---|---|---|---|
| six [non numeric word] or EOM | a. | Six translates to 6 | 6 |
| | b. | Place 6 in least significant digit in buffer | |
| | c. | Reached end of number | |

TABLE 6-continued

| Recognized Input | System Action | | Result |
|---|---|---|---|
| six four [non numeric word] or EOM | a. | Six translates to 6 | 6 |
| | b. | Place 6 in least significant digit in buffer | 6 |
| | | | 64 |
| | c. | Four translates to 4 | 64 |
| | d. | Shift buffer one digit to left | |
| | e. | Place 4 in least significant digit in buffer | |
| | f. | Reached end of number | |
| Sixty four hundred [non numeric word] or EOM | a. | Sixty four recognized as in example 2 | 64 |
| | | | 6400 |
| | b. | Hundred translates to multiply buffer by 100 | 6,400 |
| | c. | Reached end of number | |
| Six hundred and forty [non numeric word] or EOM | a. | Six translates to 6 | 6 |
| | b. | Place 6 in least significant digit in buffer | 600 |
| | | | 640 |
| | c. | Hundred translates to multiply buffer by 100 | 640 |
| | d. | Forty translates to 40 | |
| | e. | Add 40 to buffer | |
| | f. | Reached end of number | |

Figure 19:
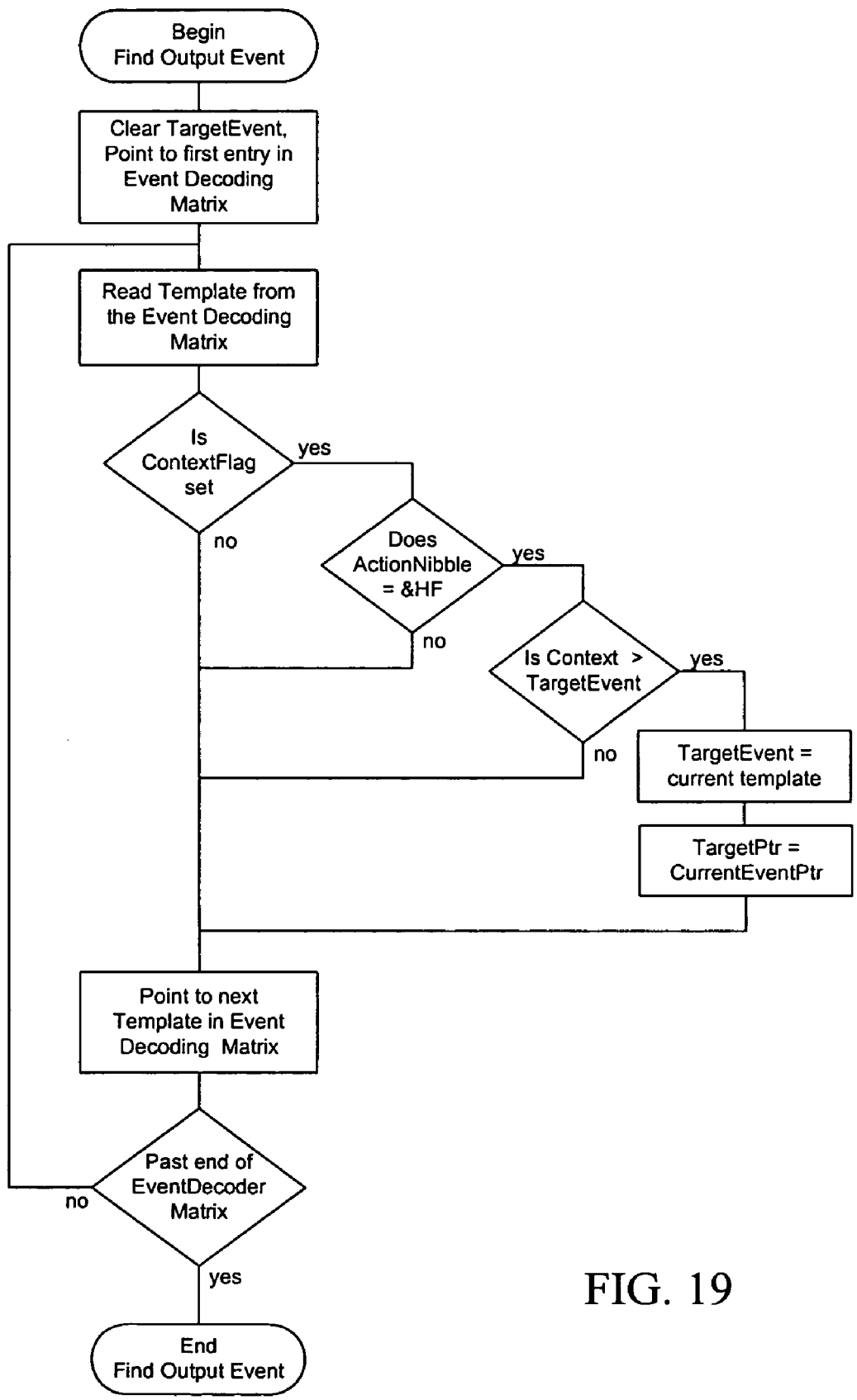
FIG. 19 illustrates processing logic to identify a selected event by finding the highest scoring event template in accordance with an exemplary embodiment of the present invention.
Figure 20:
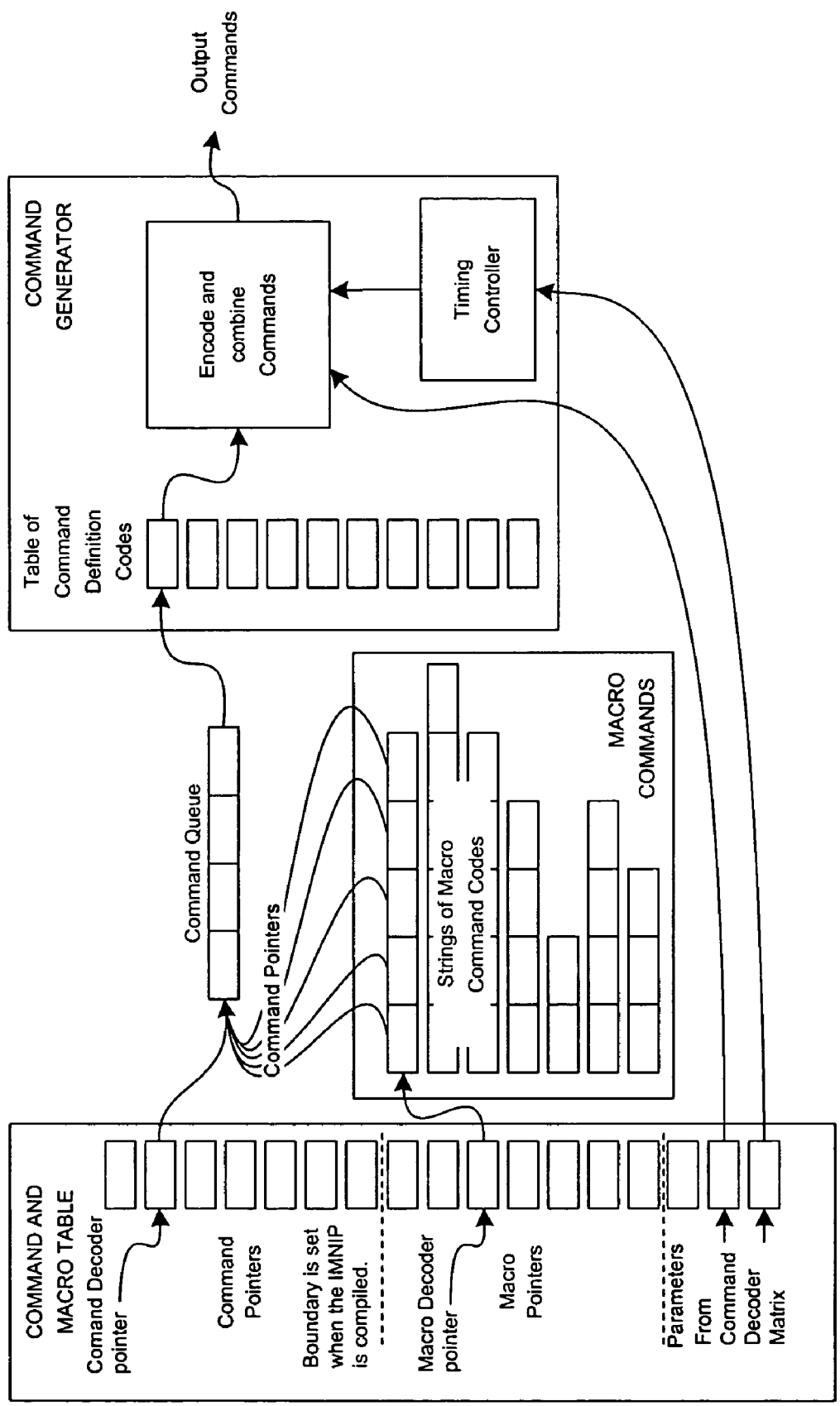
FIG. 20 illustrates the flow of messages during command and macro generation in accordance with an exemplary embodiment of the present invention.
Figure 21:
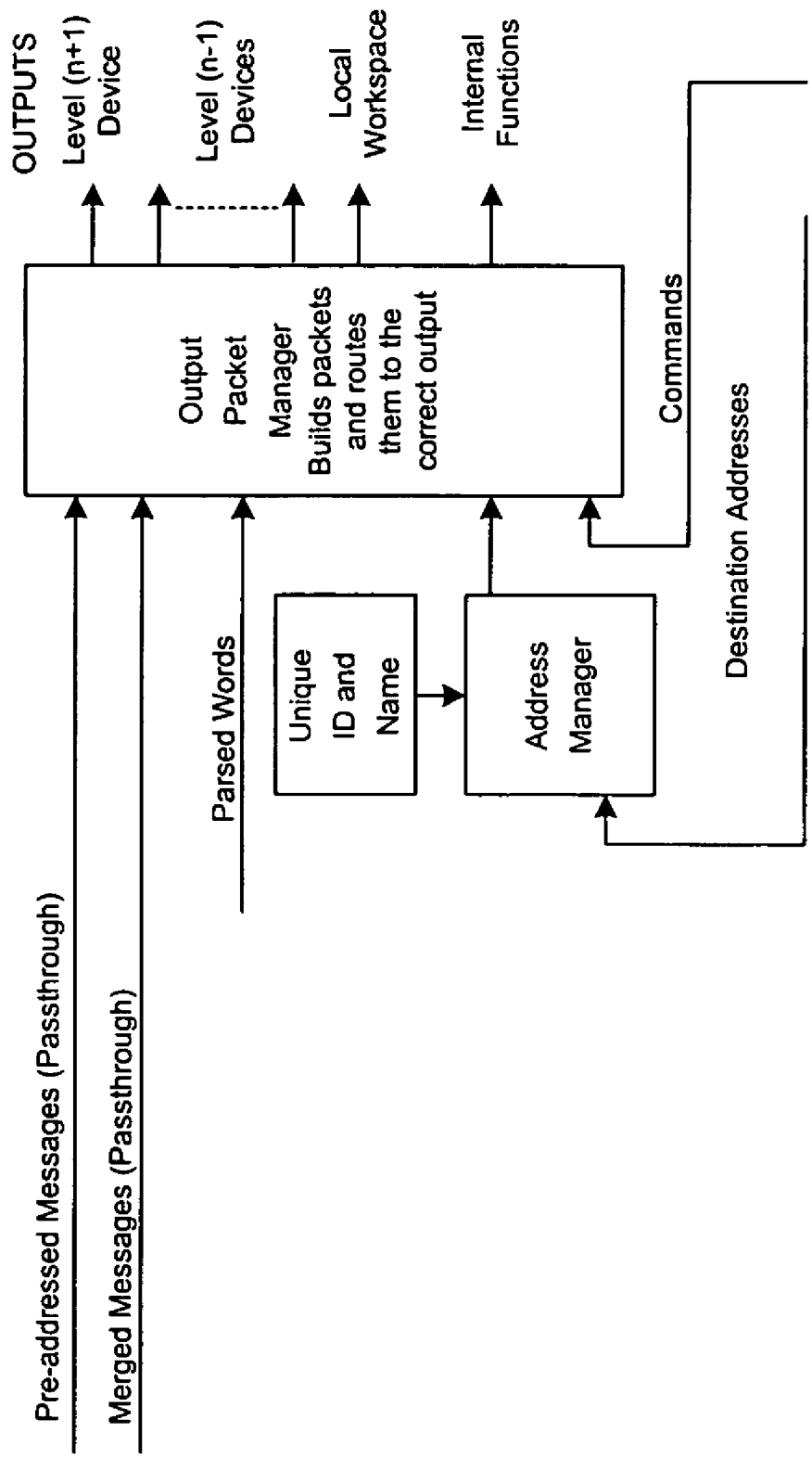
FIG. 21 illustrates the building of output packets by the output packet manager in accordance with a exemplary embodiment of the invention.
Figure 22:
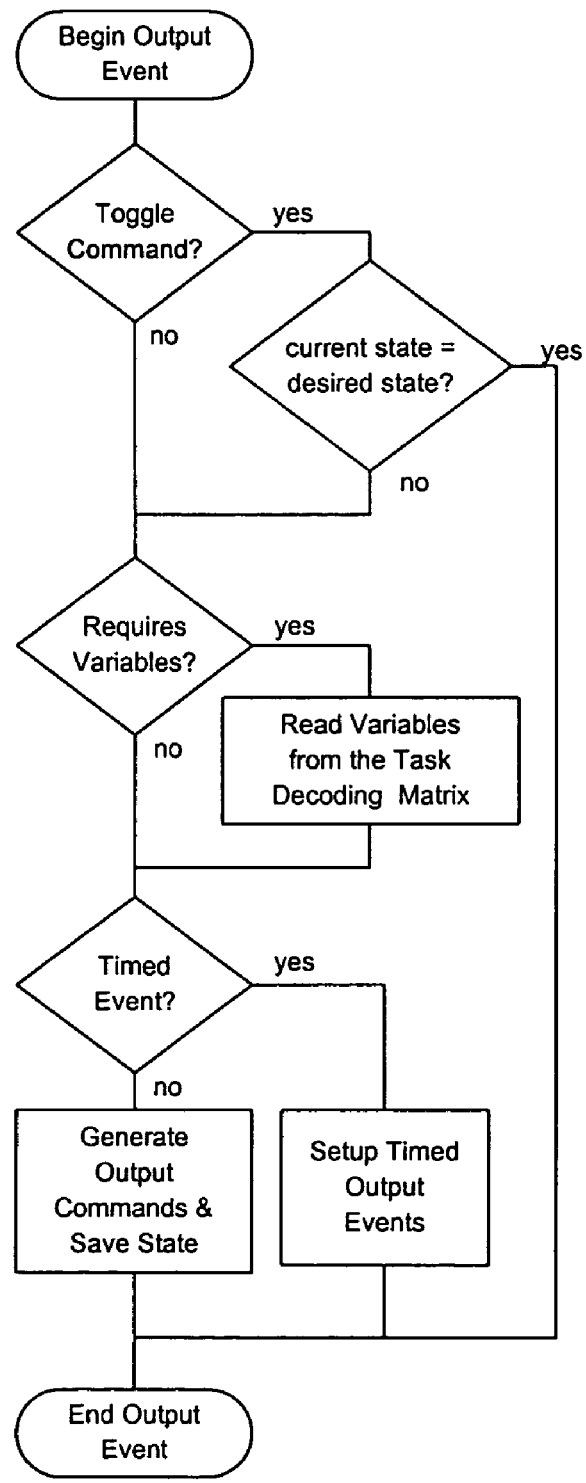
FIG. 22 illustrates the processing logic for the output event generator in accordance with an exemplary embodiment of the present invention.

FIGS. 19-22 have not been discussed in any detail herein. FIG. 19 illustrates processing logic to identify a selected event by finding the highest scoring event template. FIG. 20 illustrates the flow of messages during command and macro generation. FIG. 21 illustrates the building of output packets by the output packet manager. FIG. 22 illustrates the processing logic for the output event generator.

ASIC Support

The techniques adopted for implementing on an ASIC since all of the information necessary to analyze and interpret input messages is known at the time an IMNIP is compiled. An ASIC provides the ideal solution for implementing the unchanging command and control functions in any device that requires user interaction such as cellular telephones, PDAs, industrial control systems, automotive telematics, home theater control systems, and public access terminals.

API Support:

API support is provided by a set of ITAP/IMNIP APIs for the creation, configuration, and modification of ITAP/IMNIP modules in appliances, control systems, consumer electronics, and software applications. The API separates the application subsystem from the communication subsystem, and supports creation of command/action associations at development time and configuration/modifications during run time. The API provides a unified, vendor neutral, natural language interface for the operation of appliances, control systems, consumer electronics, and software applications, and provides a unified interface independent of input modality, implementation and platform (hardware, middleware, software) and command transport details (wired, wireless, point-to-point, broadcast, TCP/IP, 802.11, etc.). The API enables discovery, operation, and interaction with mentioned devices, as well as inter-device communications via provided command/action associations.

The present invention can be realized in hardware, software, or a combination of the two. Any kind of computer system or other apparatus adapted for carrying out the methods described herein is suited. A typical combination of hardware and software could be a general-purpose computer system that, when loaded and executed, controls the computer system such that it carries out the methods described herein. The present invention can also be embedded in a computer program product or in a microprocessor device (e.g. ASIC), which comprises all the features enabling the implementation of the methods described herein, and which when loaded in a computer system, is able to carry out these methods.

Computer program instructions or computer program in the present context means any expression, in any language, code or notation, of a set of instructions intended to cause a system having an information processing capability to perform a particular function either directly or after either or both of the following occur: (a) conversion to another language, code or notation; (b) reproduction in a different material form.

Those skilled in the art will appreciate that many modifications to the preferred embodiment of the present invention are possible without departing from the spirit and scope of the present invention. In addition, it is possible to use some of the features of the present invention without the corresponding use of other features. Accordingly, the foregoing description of the preferred embodiment is provided for the purpose of illustrating the principles of the present invention and not in limitation thereof, since the scope of the present invention is defined solely by the appended claims.

What is claimed is:

1. A system for interfacing a user with an electronic device, comprising:
    an integration manager embedded in a small microprocessor device that receives an input message from at least one of a plurality of input devices, analyzes the input message to determine user intent, and translates user intent into a command to send to a target electronic device;
    a parsing tree for detecting words in the input message that are in a predefined corpus of commands that are recognized by the system, and filtering out unrecognized words in the input message;
    an event decoding matrix for reading inputs recognized by the parsing tree and determining an event associated with the recognized words, wherein the event represents a single command or a macro that initiates a plurality of commands;
    a command generator for receiving an event from the event decoding matrix and generating commands for the target device; and
    an output packet manager for building command packets based on the commands generated by the command generator and routing the command packets to the target electronic device to control that device.

2. The system for interfacing a user with an electronic device of claim 1 further comprising a word pointer table for receiving word pointers from the parsing tree wherein each entry in the table represents a word and the word's corresponding synonyms, the entry pointing to a string in an array of strings that specifies where each word appears in the event decoding matrix.

3. The system for interfacing a user with an electronic device of claim 1 further comprising an event mask string array wherein each string in the array specifies each use of a recognized word in the event decoding matrix.

4. The system for interfacing a user with an electronic device of claim 1 wherein the at least one input device is selected from a group comprising a speech recognition device, a keyboard, a touch input device, a motion sensor, and a gesture recognition device.

5. The system for interfacing a user with an electronic device of claim 1 wherein the input message is derived from a user gesture or a plurality of encoded characters.

6. The system for interfacing a user with an electronic device of claim 1 wherein a separate independent input channel is used for each input device, with each input channel including a pointer to a current node in the parsing tree as the parsing tree is traversed.

7. The system for interfacing a user with an electronic device of claim 1 wherein the integration manager integrates input messages from a plurality of input devices into a single message stream for parsing by the parsing tree.

8. The system for interfacing a user with an electronic device of claim 1 wherein the event decoding matrix processes events specified by commands in which the words are received in a random order.

9. The system for interfacing a user with an electronic device of claim 1 wherein the event decoding matrix processes events in which commands for the target device must be received with the words in a defined order.

10. The system for interfacing a user with an electronic device of claim 1 wherein the event decoding matrix processes a plurality of parameters to control a timing of specific commands for execution on the target device.

11. The system for interfacing a user with an electronic device of claim 1 further comprising a command and macro manager for receiving events from the event decoding matrix and generating at least one of a command definition string and a macro definition string to input to the command generator.

12. The system for interfacing a user with an electronic device of claim 11 wherein the command definition string specifies an actual code that is sent to the target device to perform a specified command.

13. The system for interfacing a user with an electronic device of claim 11 wherein the macro definition string specifies a group of commands that are to be decoded by command definition strings and sent to the target device.

14. The system for interfacing a user with an electronic device of claim 1 wherein the integration manger operates independently of each of the plurality of input devices.

* * * * *